United States Patent
Kishiyama et al.

(10) Patent No.: US 9,467,989 B2
(45) Date of Patent: Oct. 11, 2016

(54) BASE STATION APPARATUS, MOBILE TERMINAL APPARATUS, COMMUNICATION SYSTEM AND COMMUNICATION METHOD

(75) Inventors: Yoshihisa Kishiyama, Tokyo (JP); Kazuaki Takeda, Tokyo (JP); Satoshi Nagata, Tokyo (JP); Tetsushi Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 198 days.

(21) Appl. No.: 14/114,442

(22) PCT Filed: Feb. 9, 2012

(86) PCT No.: PCT/JP2012/052979
§ 371 (c)(1),
(2), (4) Date: Nov. 22, 2013

(87) PCT Pub. No.: WO2012/150664
PCT Pub. Date: Nov. 8, 2012

(65) Prior Publication Data
US 2014/0064244 A1    Mar. 6, 2014

(30) Foreign Application Priority Data
May 2, 2011 (JP) .................. 2011-103069

(51) Int. Cl.
H04W 72/04 (2009.01)
H04L 5/00 (2006.01)

(52) U.S. Cl.
CPC .......... *H04W 72/042* (2013.01); *H04L 5/0041* (2013.01); *H04L 5/0053* (2013.01); *H04L 5/0007* (2013.01); *H04L 5/0023* (2013.01)

(58) Field of Classification Search
CPC .................................. H04W 72/042
See application file for complete search history.

(56) References Cited

U.S. PATENT DOCUMENTS

| 7,729,377 B2 | 6/2010 | Seo et al. |
| 7,885,230 B2 | 2/2011 | Seo et al. |

(Continued)

FOREIGN PATENT DOCUMENTS

EP    1 234 567 A2    8/2002

OTHER PUBLICATIONS

International Search Report for corresponding International Application No. PCT/JP2012/052979, mailed May 15, 2012 (2 pages).

(Continued)

*Primary Examiner* — Charles C Jiang
*Assistant Examiner* — Thad Defauw
(74) *Attorney, Agent, or Firm* — Osha Liang LLP

(57) ABSTRACT

The present invention is designed to provide a base station apparatus, a mobile terminal apparatus, a communication system and a communication method that cope with the shortage of downlink control channel capacity. For a mobile terminal apparatus that receives downlink signals using a resource region for downlink control signals and a resource region for downlink data signals, a base station apparatus is configured to set a plurality of virtual resources for downlink control signals in a plurality of physical resources that are arranged in a frequency direction in the resource region for downlink data signals, and allocate the downlink control signals, in a distributed manner, between virtual resources of a relatively low frequency band side and virtual resources of a relatively high frequency band side in a plurality of virtual resources.

15 Claims, 17 Drawing Sheets

(56) References Cited

U.S. PATENT DOCUMENTS

| | | | |
|---|---|---|---|
| 2005/0089048 A1* | 4/2005 | Chittenden | H04L 12/24 370/395.54 |
| 2008/0205348 A1* | 8/2008 | Malladi | H04L 1/1607 370/335 |
| 2010/0067479 A1* | 3/2010 | Choi | H04W 72/042 370/330 |
| 2013/0301604 A1* | 11/2013 | Skov | H04L 5/0023 370/329 |

OTHER PUBLICATIONS

Nortel et al., "Way Forward on DVRB to PRB index mapping;" 3GPP RAN WG1 #52, R1-081113; Sorrento, Italy; Feb. 11-15, 2008 (4 page).

NTT Docomo, Inc. et al., "Uplink Timing Control for E-UTRA;" 3GPP TSG RAN WG1 Meeting #47, R1-063328; Riga, Latvia; Nov. 6-10, 2006 (3 pages).

LG Electronics; "Search Space Design for Non-interleaved R-PDCCH;" 3GPP TSG RAN WG1 Meeting #62, R1-104657; Madrid, Spain; Aug. 23-27, 2010 (6 pages).

LG Electronics Inc.; "R-PDCCH interleaving alternatives;" TSG-RAN WG1 Meeting #61bis, R1-103736; Dresden, Germany; Jun. 28-Jul. 2, 2010 (6 pages).

Mitsubishi Electric; "Mapping Detail of the Distributed Allocation;" 3GPP TSG RAN WG1 #52bis, Tdoc R1-081184; Shenzhen, China; Mar. 31-Apr. 4, 2008 (8 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).

Japanese Office Action issued in Japanese Patent Application No. 2011-103069, mailing date Jun. 25, 2013, with English translation thereof (8 pages).

Decision to Grant a Patent in corresponding Japanese application No. 2011-103069, mailed Aug. 19, 2014 (4 pages).

Nortel et al., "Way Forward on DVRB to PRB index mapping;" 3GPP RAN WG1 #52, R1-081113; Sorrento, Italy; Feb. 11-15, 2008 corresponds to EP1 234 567 (4 pages).

Office action issued in corresponding Japanese application No. 2011-103069, mailed Mar. 25, 2014 (4 pages).

Office action issued in corresponding Japanese application No. 2011-103069, mailed Jun. 3, 2014 (4 pages).

Office Action issued in corresponding Indonesian Application No. W00201305036, mailed Jun. 20, 2016 (4 pages).

ETRI; "Remaining details of non-interleaving R-PDCCH search space"; 3GPP TSG RAN WG1 Meeting #63, R1-106169; Jacksonville, USA; Nov. 15-19, 2010 (4 pages).

Catt et al.; "Way forward on R-PDCCH blind decodings for non-interleaving mode"; TSG-RAN WG1 Meeting #62, R1-105062; Madrid, Spain; Aug. 23-27, 2010 (3 pages).

* cited by examiner $N_{VRB}^{R-PDCCH} = 8$ WHEN RESOURCE ALLOCATION TYPE IS 0

FIG. 6

BASE STATION APPARATUS, MOBILE TERMINAL APPARATUS, COMMUNICATION SYSTEM AND COMMUNICATION METHOD

TECHNICAL FIELD

The present invention relates to a base station apparatus, a mobile terminal apparatus, a communication system and a communication method in a next generation mobile communication system.

BACKGROUND ART

In the UMTS (Universal Mobile Telecommunications System) network, for the purposes of further increasing high-speed data rates, providing low delay and so on, long-term evolution (LTE) has been under study (non-patent literature 1). In LTE, as multi-access schemes, a scheme that is based on OFDMA (Orthogonal Frequency Division Multiple Access) is used on the downlink, and a scheme that is based on SC-FDMA (Single Carrier Frequency Division Multiple Access) is used on the uplink.

Furthermore, for the purpose of achieving further broadbandization and higher speed, successor systems of LTE are also under study (for example, also referred to as "LTE-Advanced" or "LTE enhancement" (hereinafter referred to as "LTE-A")). In LTE (Rel. 8) and LTE-A (Rel. 9 and Rel. 10), MIMO (Multi Input Multi Output) techniques are under study as radio communication techniques to transmit and receive data by a plurality of antennas and improve spectral efficiency. In the MIMO system, a plurality of transmitting/receiving antennas are provided in the transmitter/receiver, so that different transmission information sequences are transmitted from different transmitting antennas at the same time.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in successor systems of LTE (for example, Rel. 9 and Rel. 10), multi-user MIMO (MU-MIMO: Multiple User MIMO) to transmit transmission information sequence to different users from different transmitting antennas at the same time, is defined. Regarding this MU-MIMO transmission, application to a Hetnet (Heterogeneous network) and CoMP (Coordinated Multi-Point) transmission is under study as well. Consequently, in future systems, the number of users to be connected to a base station apparatus is expected to increase, and therefore there is a threat that conventional radio resource allocation configurations will not be able to derive optimal performance of future systems such as MU-MIMO transmission.

The present invention has been made in view of the above, and it is therefore an object of the present invention to provide a base station apparatus, a mobile terminal apparatus, a communication system and a communication method that can cope with an increase of the number of users.

Solution to Problem

A base station apparatus according to the present invention includes: a generating section that generates downlink control signals for a mobile terminal apparatus that receives downlink signals using a resource region for downlink control signals and a resource region for downlink data signals; an allocation section that sets a plurality of virtual resources for downlink control signals in a plurality of physical resources that are arranged in a frequency direction in the resource region for downlink control signals, and allocates the downlink control signals to the virtual resources; and a transmission section that transmits the downlink control signals allocated by the allocation section, and, in this base station apparatus, in the plurality of virtual resources, the allocation section allocates the downlink control signals, in a distributed manner, between virtual resources of a relatively low frequency band side and virtual resources of a relatively high frequency band side.

Advantageous Effects of Invention

According to the present invention, in a resource region for downlink data signals, downlink control signals are allocated, in a distributed manner, to physical resources corresponding to virtual resources of a relatively low frequency band side and virtual resources of a relatively high frequency band side. Consequently, the base station apparatus is able to cope with an increase of the number of users using a resource region for downlink data signals. Also, downlink control signals are distributed between a relatively low frequency band side and a relatively high frequency band side, so that it is possible to reduce the influence of fading variation that is produced by movement of a mobile terminal apparatus and interference from other cells.

BRIEF DESCRIPTION OF DRAWINGS

FIG. 6 is a diagram to explain "without cross interleaving;"

DESCRIPTION OF EMBODIMENTS

Figure 1:
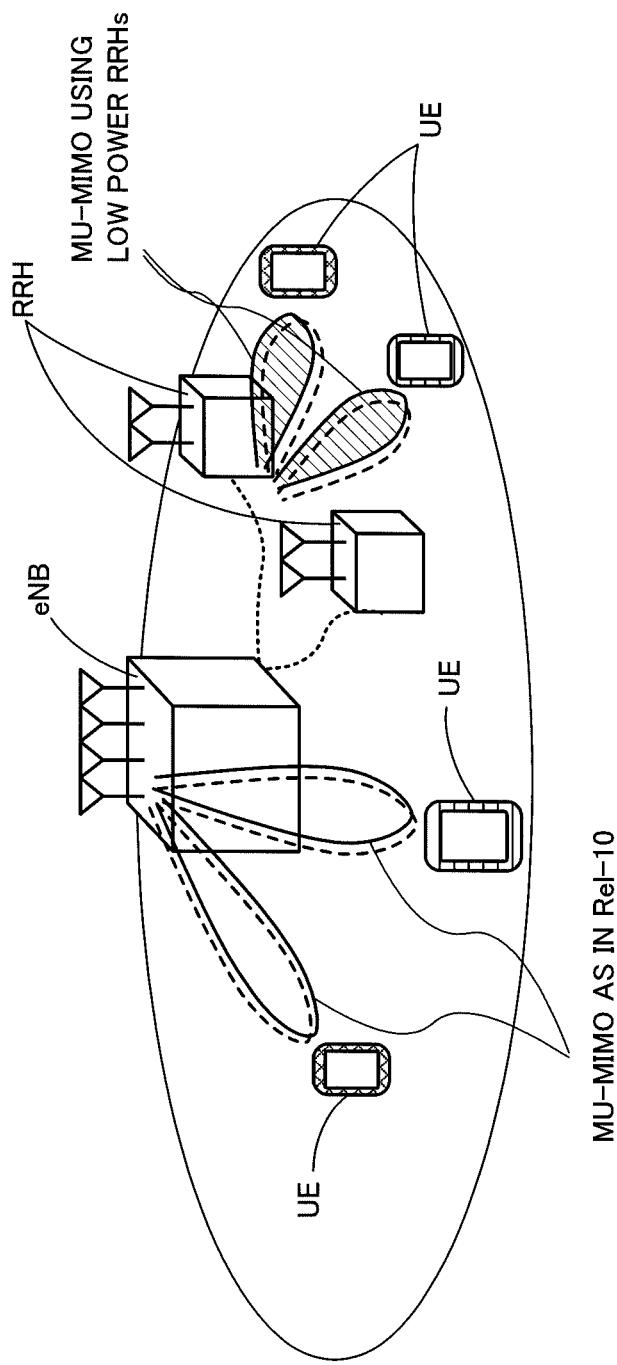
FIG. 1 is a schematic diagram of a Hetnet where MU-MIMO is applied.

FIG. 1 is a schematic diagram of a Hetnet where MU-MIMO is applied. The system shown in FIG. 1 is configured in layers by providing a micro base station apparatus RRH (Remote Radio Head) having a local cell in the cell of a base station apparatus eNB (eNodeB). In downlink MU-MIMO transmission in such a system, not only transmitting data to a plurality of mobile terminal apparatus UEs (User Equipment) from a plurality of antennas of a base station apparatus eNB at the same time, but also transmitting data for a plurality of mobile terminal apparatus UEs from a plurality of antennas of a macro base station apparatus RRH at the same time is expected.

Figure 2:
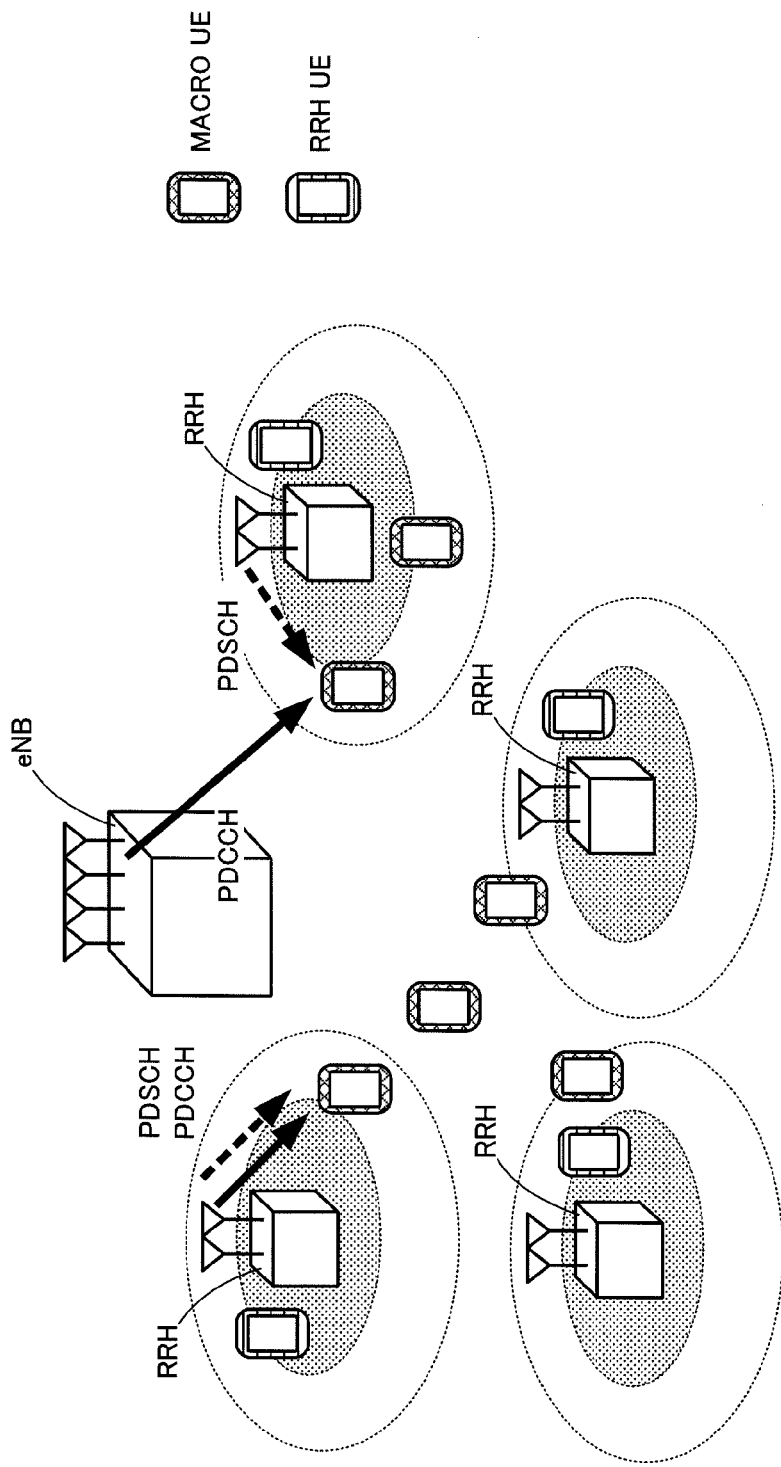
FIG. 2 is a schematic diagram of a Hetnet where CoMP is applied.

FIG. 2 is a schematic diagram of a Hetnet where CoMP is applied. In the system shown in FIG. 2, cell range expansion may be executed dynamically. In this case, a mobile terminal apparatus UE that is located near the cell edge of a macro base station apparatus RRH receives downlink control signals from a base station apparatus eNB, and receives downlink data signals from the macro base station apparatus RRH. Consequently, the base station apparatus eNB needs to add a downlink control channel for the mobile terminal apparatus UE near the cell edge. Although a configuration to transmit downlink control signals from the macro base station apparatus RRH may be possible, the macro base station apparatus RRH has limited downlink control channel capacity.

Figure 3:
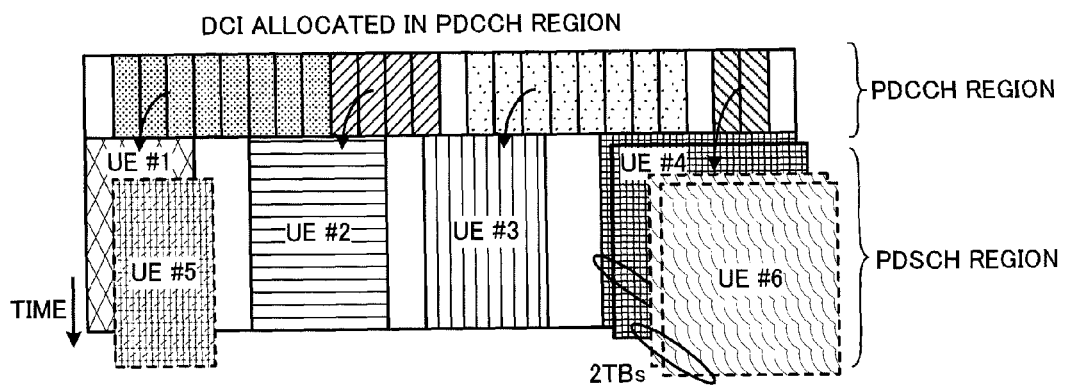
FIG. 3 is a diagram to show an example of a subframe where downlink MU-MIMO transmission is performed.

FIG. 3 is a diagram to show an example of a subframe where downlink MU-MIMO transmission is applied. In a subframe, downlink data to be transmitted by a downlink data channel (PDSCH: Physical Downlink Shared Channel) and downlink control information (DCI: Downlink Control Information) to be transmitted by a downlink control channel (PDCCH: Physical Downlink Control Channel) are time-division-multiplexed and transmitted. Three OFDM symbols from the top are secured as a resource region (PDCCH region) for downlink control signals at a maximum.

In the PDCCH region, downlink control information for each mobile terminal apparatus UE is allocated. However, cases might occur where, in the PDCCH region that is formed with maximum three OFDM symbols from the subframe top alone, downlink control information for all mobile terminal apparatus UEs cannot be allocated. For example, as shown in FIG. 1 and FIG. 2, when a HetNet and CoMP are applied to MU-MIMO transmission, downlink control channel capacity is expected to run short. In the example shown in FIG. 3, the PDCCH region runs short due to increased downlink control information, and it is not possible to secure resources to allocate downlink control information for mobile terminal apparatus UEs #5 and #6. In this way, although the spectral efficiency is improved by MU-MIMO, the PDCCH region may run short, and the influence against the throughput performance of MU-MIMO transmission poses a problem.

Figure 4:
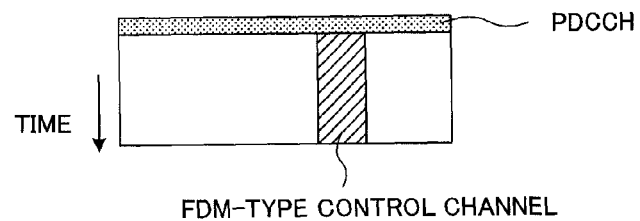
FIG. 4 is a diagram to explain an enhanced PDCCH (FDM-type PDCCH)

In order to solve this shortage of the PDCCH region, it may be possible to expand the PDCCH region to the resource region for downlink data signals (PDSCH region). As shown in FIG. 4, an FDM-type PDCCH to use a predetermined frequency band of the PDSCH region as an enhanced PDCCH region is under study. This enhanced PDCCH region is demodulated using a DM-RS (Demodulation-Reference Signal). The DM-RS is defined as a UE-specific reference signal and can be subjected to beam forming separately between UEs, so that sufficient received quality can be achieved. Consequently, it is possible to decrease the aggregation level, which is effective to increase the capacity. Note that the enhanced PDCCH may also be referred to as "UE-PDCCH."

Figure 5:
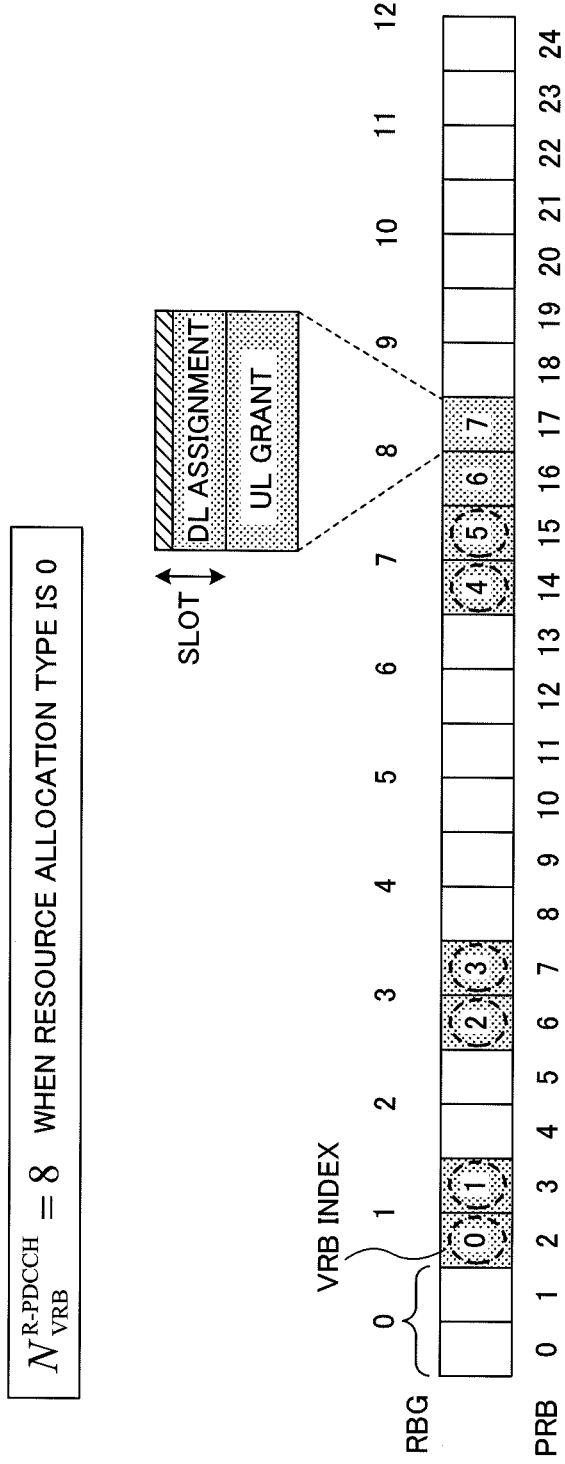
FIG. 5 is a diagram to show an example of setting of virtual resources in an enhanced PDCCH.

In this enhanced PDCCH, a plurality of virtual resources are set (mapped) in a plurality of physical resources that are arranged in the frequency direction, and downlink control information is allocated to these virtual resources. Here, an example of setting of virtual resources in an enhanced PDCCH will be described with reference to FIG. 5. Note that FIG. 5 shows a case where a set of eight virtual resource blocks (VRBs) sets as virtual resource in a bandwidth formed with twenty-five physical resource blocks (PRBs) as physical resources. Obviously, the present invention is not limited to this.

In PRBs, NVRB VRB sets are set based on the resource allocation type (resource allocation types 0, 1 and 2), by upper layers. The resource allocation types 0 and 1 support discontinuous frequency arrangement in the frequency domain, and the resource allocation type 2 supports only continuous frequency arrangement in the frequency domain. The resource allocation type 0 is represented in units of groups of neighboring resource blocks, not in units of individual resource blocks in the frequency domain. In FIG. 5, the bandwidth is formed with twenty-five resource blocks, so that the size of a resource block group (RBG) is two. Eight VRBs are mapped to RBGs #1, #3, #7, and #8, in units of two.

The VRB set is reported to a mobile terminal apparatus by upper layer signals. In the VRB, as downlink control information, DL assignment is allocated to the first-half slot and a UL grant is allocated to the second-half slot. Note that the information to be allocated to VRB is not limited to these. Also, as enhanced PDCCH formats, a method of interleaving an enhanced PDCCH in PRBs ("with cross interleaving") and a method of not interleaving an enhanced PDCCH in PRBs ("without cross interleaving") may be possible.

In the event of "with cross interleaving," a mobile terminal apparatus performs blind decoding in search spaces defined by CCE indices (control channel element indices). Also, in the event of "without cross interleaving," a mobile terminal apparatus performs blind decoding in search spaces defined by VRB indices. Now, "without cross interleaving" will be described below.

In the event of "without cross interleaving," downlink control information is allocated in PRB units. In this case, aggregation levels (aggregation levels Λ=1, 2, 4 and 8) are determined based on the received quality reported from a mobile terminal apparatus. The VRB index nVRB for each aggregation level is given by the following equation:

$$n_{VRB}^{FDM\text{-}PDCCH} = (\Lambda \cdot m + i) \bmod N_{VRB}^{FDM\text{-}PDCCH} \quad [1]$$

Figure 6:
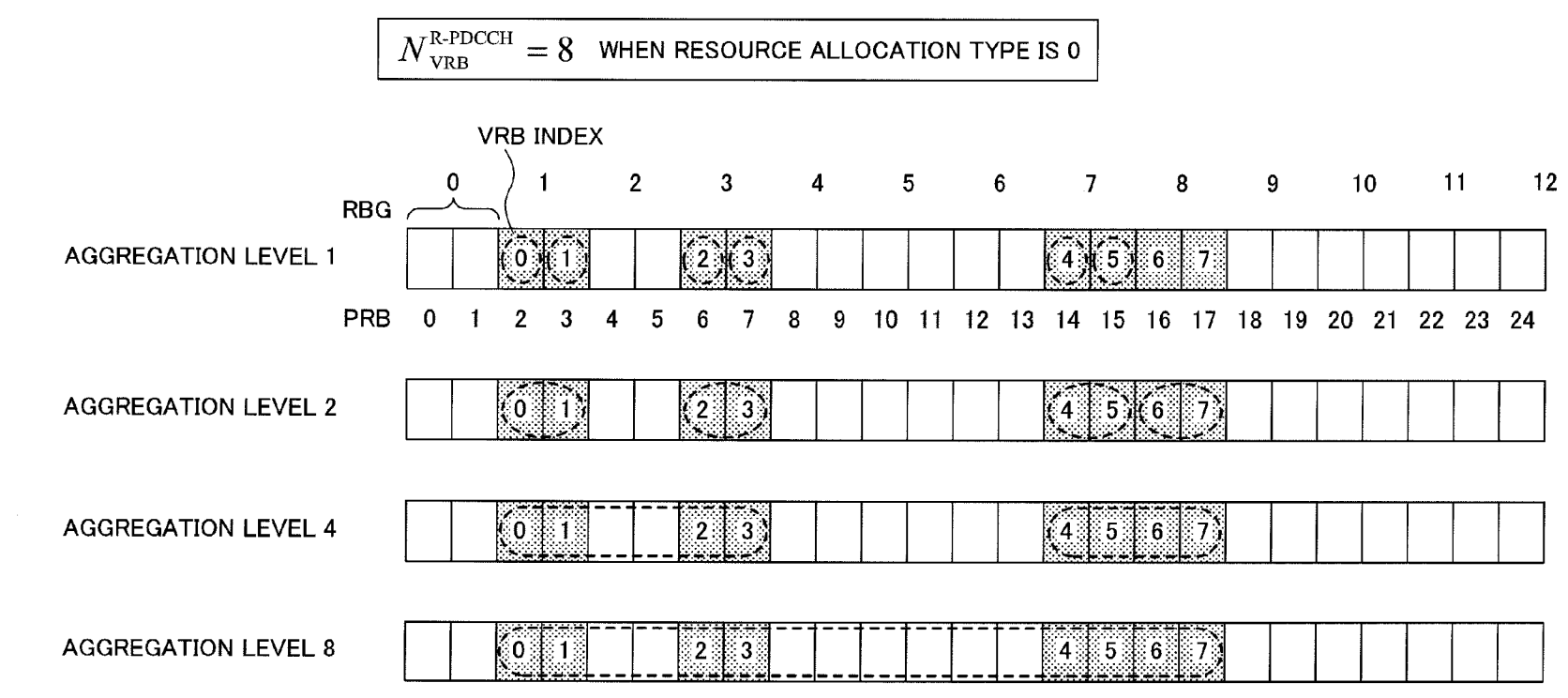

As shown in FIG. 6, when the resource allocation type is 0, eight VRBs are allocated to twenty-five PRBs that are arranged in the frequency direction. The VRBs are numbered by VRB indices, in order, from the smallest PRB index (RBG index). At aggregation levels 1, 2, 4 and 8, the number of blind decoding (the number of search spaces) can be made 6, 6, 2 and 2, respectively. In these VRBs, search spaces are set in order from the smallest VRB index.

At aggregation level 1, six search spaces are set in VRBs #0 to #5. At aggregation level 2, four search spaces are set in VRBs #0 to #7, in two-VRB units. At aggregation level 4, two search spaces are set in VRBs #0 to #7, in four-VRB units. At aggregation level 8, one search space is set in VRBs #0 to #7, in eight-VRB units. Note that search spaces overlap between aggregation levels 2 and 8, due to shortage of the number of VRBs.

Then, in the mobile terminal apparatus, blind decoding of search spaces is performed according to the aggregation level, and downlink control information that is allocated to the VRBs is acquired. In this way, in the event of "without cross interleaving," each user's downlink control information is allocated in PRB units, and is subjected to blind decoding in search spaces defined by VRB indices.

However, with an enhanced PDCCH defined in this way, fading variation that is produced by movement of a mobile terminal apparatus and interference from other cells are not given sufficient consideration. So, the present inventors have arrived at the present invention in order to design an enhanced PDCCH to be robust against fading variation and so on. That is, given a plurality of PRBs that are arranged in the frequency direction, a gist of the present invention is to allocate downlink control information, in a distributed manner, to the PRBs (VRBs) of a relatively low frequency band side and to the PRBs (VRBs) of a relatively high frequency band side.

Figure 7:
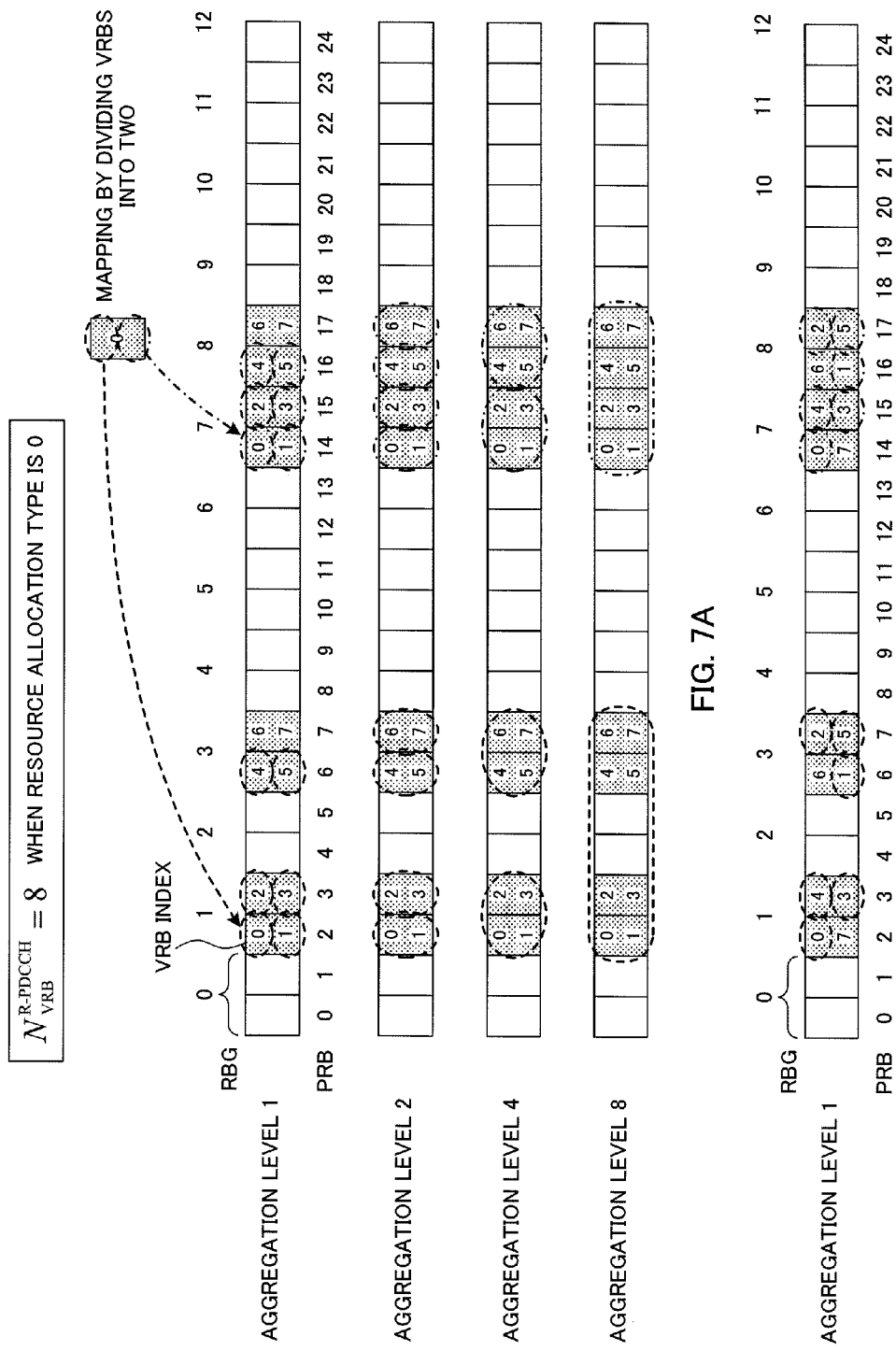
FIG. 7 is a diagram to show an example of the first mapping method to use frequency hopping.

Here, frequency diversity in the present embodiment will be described with reference to FIG. 7 to FIG. 10. FIG. 7 shows an example of the first mapping method to use frequency hopping. The first mapping method is a method of dividing VRBs into several and mapping these VRBs to each PRB for setting VRBs. Here, although an example of a case where the resource allocation types is 0 and VRBs are divided into two is shown here, this is by no means limiting. PRBs for setting VRBs are set in RBGs #1 and #3 (PRBs #2, #3, #6 and #7) on a relatively low frequency band side and in RBGs #7 and #8 (PRBs #14 to #17) on a relatively high frequency band side.

As shown in FIG. 7A, in PRBs for setting VRBs, VRBs that are divided into two are multiplexed and mapped. Also, each divided VRB is numbered by a VRB index. With the first mapping method, VRBs of a relatively low frequency band side and VRBs of a relatively high frequency band side are numbered by VRB indices, in ascending order, from one end of the frequency direction. That is, VRBs of the lower frequency band side and VRBs of the higher frequency band side are associated with each other, toward one direction, in the frequency direction. To be more specific, PRBs #2, #3, #6 and #7 of the lower frequency band side are associated with PRBs #14, #15, #16 and #17 of the higher frequency band side.

In these VRBs, downlink control information allocation candidates (search spaces) are set in order from the smallest VRB index. At aggregation level 1, downlink control information allocation candidates are set in VRBs #0 to #5 on the lower frequency band side and the higher frequency band side. In this case, downlink control information is divided into two and allocated to the VRBs of the lower frequency band side and the VRBs of the higher frequency band side, in a distributed manner. For example, downlink control information is allocated to VRBs #0 of the lower frequency band side and the higher frequency band side that are divided into two. By this means, it is possible to reduce the influence of fading variation that is produced by movement of a mobile terminal apparatus and interference from other cells.

At aggregation level 2, downlink control information allocation candidates are set in VRBs #0 to #7 of the lower frequency band side and the higher frequency band side, in two-VRB units. At aggregation level 4, downlink control information allocation candidates are set in VRBs #0 to #7 of the lower frequency band side and the higher frequency band side, in four-VRB units. At aggregation level 8, downlink control information allocation candidates are set in VRBs #0 to #7 of the lower frequency band side and the higher frequency band side, in eight-VRB units. Also, at aggregation levels 2, 4 and 8, downlink control information is allocated in a distributed manner, so that it is possible to reduce the influence of fading variation and so on.

Note that the case of dividing VRBs into two is by no means limiting, and a configuration to divide VRBs into three or more, and multiplex and set three or more VRBs on one PRB is also possible. Also, the numbering of VRBs is by no means limited to the above configuration, and, as shown in FIG. 7B, a configuration to perform interleaving in cell-specific patterns and/or the like is also possible. Also, the arrangement pattern of PRBs for setting VRBs is by no means limited to the above configuration and can be changed as appropriate. Also, unlike the above configuration, VRB indices may as well be numbered in descending order from one end.

Figure 8:
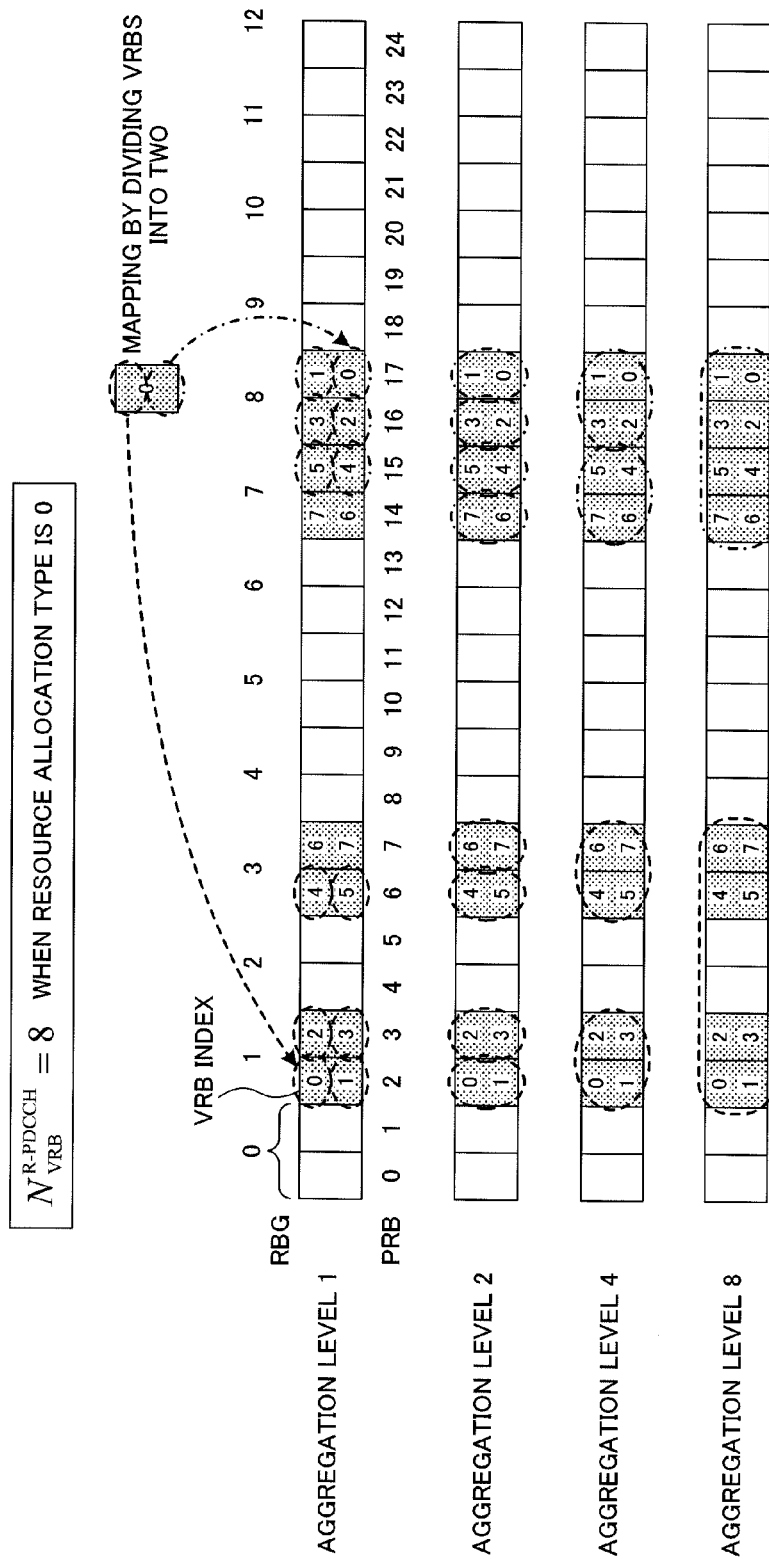
FIG. 8 shows an example of a second mapping method to use frequency hopping.

FIG. 8 shows an example of a second mapping method to use frequency hopping. The second mapping method is a method of dividing VRBs into two and allocate the VRBs to PRBs for setting VRBs, in a manner of a PUCCH (Physical Uplink Control Channel). Although a case is shown here where the resource allocation type is 0 and VRBs are divided into two, this is by no means limiting. PRBs for setting VRBs are set in RBGs #1 and #3 (PRBs #2, #3, #6 and #7) on the relatively low frequency band side and RBGs #7 and #8 (PRBs #14 to #17) on the relatively high frequency band side.

In PRBs for setting VRBs, VRBs that are divided into two are multiplexed and mapped. Also, each divided VRB is numbered by a VRB index. With the second mapping method, VRBs of a relatively low frequency band side are numbered by VRB indices, in ascending order, from one end of the frequency direction, and VRBs of a relatively high frequency band side are numbered by VRB indices, in descending order, from one end of the frequency direction. That is, VRBs of the lower frequency band side and VRBs of the higher frequency band side are associated with each other, in order, from both ends of the frequency direction. To be more specific, PRBs #2, #3, #6 and #7 of the lower frequency band side are associated with PRBs #17, #16, #15 and #14 of the higher frequency band side, respectively.

In these VRBs, downlink control information allocation candidates are set in order from the smallest VRB index. At aggregation level 1, downlink control information allocation candidates are set in VRBs #0 to #5 on the lower frequency band side and the higher frequency band side. In this case, downlink control information is divided into two and allocated to the VRBs of the lower frequency band side and the VRBs of the higher frequency band side, in a distributed manner. For example, downlink control information is allocated to VRBs #0 at both ends of the lower frequency band side and the higher frequency band side that are divided into two. By this means, it is possible to reduce the influence of fading variation that is produced by movement of a mobile terminal apparatus and interference from other cells. Also, the second mapping method is effective to allocate downlink control information to both ends of the frequency band.

At aggregation level 2, downlink control information allocation candidates are set in VRBs #0 to #7 of the lower frequency band side and the higher frequency band side, in two-VRB units. At aggregation level 4, downlink control information allocation candidates are set in VRBs #0 to #7 of the lower frequency band side and the higher frequency band side, in four-VRB units. At aggregation level 8, downlink control information allocation candidates are set in VRBs #0 to #7 of the lower frequency band side and the higher frequency band side, in eight-VRB units. Also, at aggregation levels 2, 4 and 8, downlink control information is allocated in a distributed manner, so that it is possible to reduce the influence of fading variation and so on.

Also, the arrangement pattern of PRBs for setting VRBs is by no means limited to the above configuration and can be changed as appropriate. Also, unlike the above configuration, it is also possible to number VRB indices in descending order from one end of the frequency direction with respect to the VRBs of a relatively low frequency band side, and number VRB indices in ascending order from one end of the frequency direction with respect to the VRBs of a relatively high frequency band side.

Figure 9:
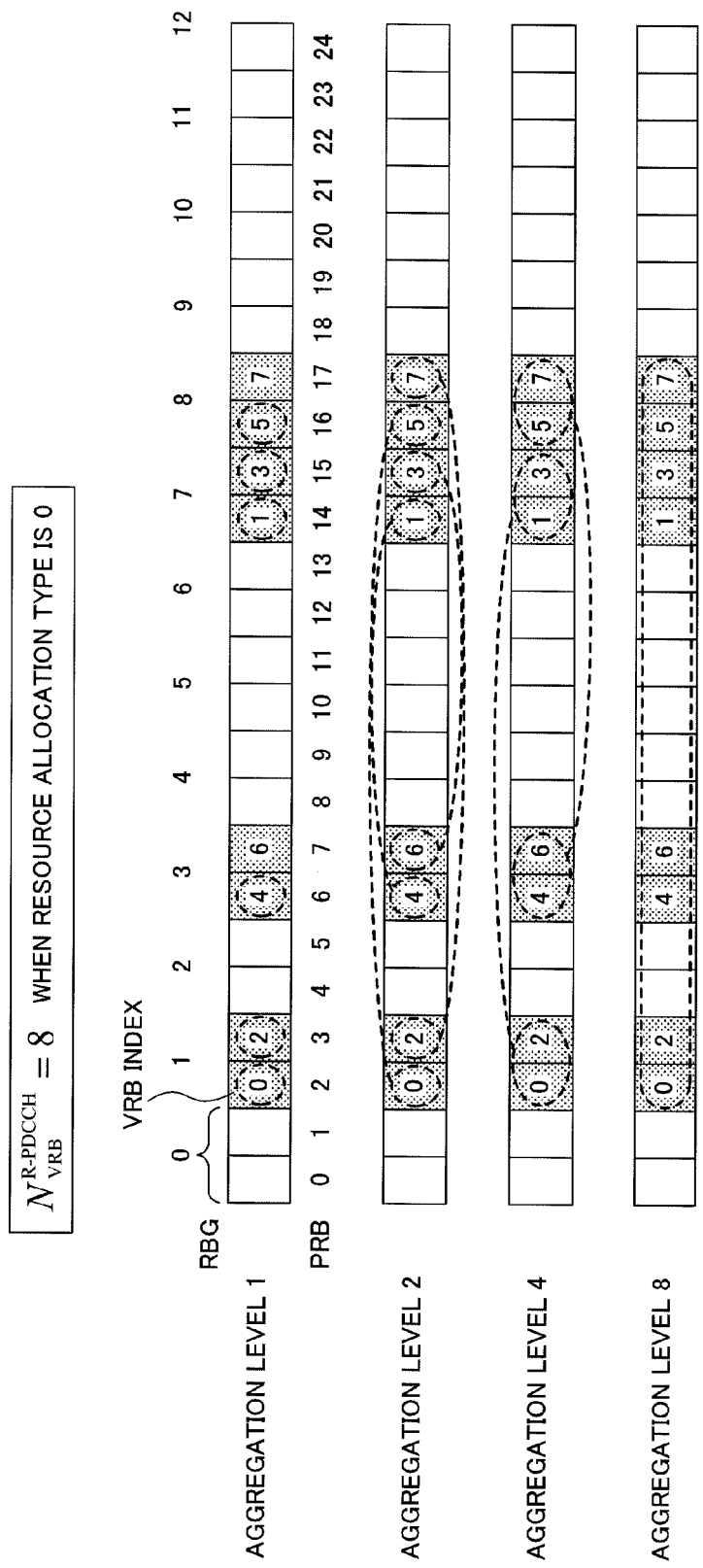
FIG. 9 shows an example of a third mapping method to use frequency hopping.

FIG. 9 shows an example of a third mapping method to use frequency hopping. The third mapping method is a method of mapping discontinuous VRBs to PRBs by VRB numbering. Although an example of a case where the resource allocation type is 0 is shown here, this is by no means limiting. PRBs for setting VRBs are set in RBGs #1 and #3 (PRBs #2, #3, #6 and #7) on a relatively low frequency band side and in RBGs #7 and #8 (PRBs #14 to #17) on a relatively high frequency band side.

VRBs are mapped to the PRBs for setting VRBs, and each VRB is numbered by a VRB index. With the third mapping method, the VRBs of a relatively low frequency band side and the VRBs of a relatively high frequency band side are numbered alternately by VRB indices. In FIG. 9, the VRBs of a relatively low frequency band side are numbered by even-numbered indices, and the VRBs of a relatively high frequency band side are numbered by odd-numbered indices. To be more specific, VRBs #0, #2, #4 and #6 are mapped to PRBs #2, #3, #6 and #7 of the lower frequency band side, respectively, and VRBs #1, #3, #5 and #7 are mapped to PRBs #14, #15, #16 and #17 of the higher frequency band side, respectively.

In these VRBs, downlink control information allocation candidates are set in order from the smallest VRB index. With this third mapping method, it is possible to achieve a frequency diversity effect at aggregation level 2 or above. At aggregation level 2, downlink control information allocation candidates are set in VRBs #0 to #7 of the lower frequency band side and the higher frequency band side. In this case, among two pieces of downlink control information that are aggregated, one piece of the downlink control information is allocated to VRBs of the lower frequency band side, and the other piece of the downlink control information is allocated to VRBs of the higher frequency band side. For example, one piece of the downlink control information is allocated to VRB #0 of the lower frequency band side, and the other piece of the downlink control information is allocated to VRB #1 of the higher frequency band side. By this means, it is possible to reduce the influence of fading variation that is produced by movement of a mobile terminal apparatus and interference from other cells. Likewise, even at aggregation level 4 or above, a plurality of pieces of downlink control information that are aggregated are allocated in a distributed manner, so that it is possible to reduce the influence of fading variation.

This third mapping method makes possible a simple configuration compared to the first and second mapping methods, although the frequency diversity effect is poorer. Note that the numbering of VRBs is not limited to the above configuration, and it is equally possible to number VRBs of a relatively low frequency band side by even-numbered indices and number VRBs of a relatively high frequency band side by odd-numbered indices. Also, regarding the numbering of VRBs, it is also possible to provide a configuration to perform interleaving in cell-specific patterns. Also, the arrangement pattern of PRBs for setting VRBs is by no means limited to the above configuration and can be changed as appropriate. Also, the third mapping method may be used together with the first and second mapping methods.

Figure 10:
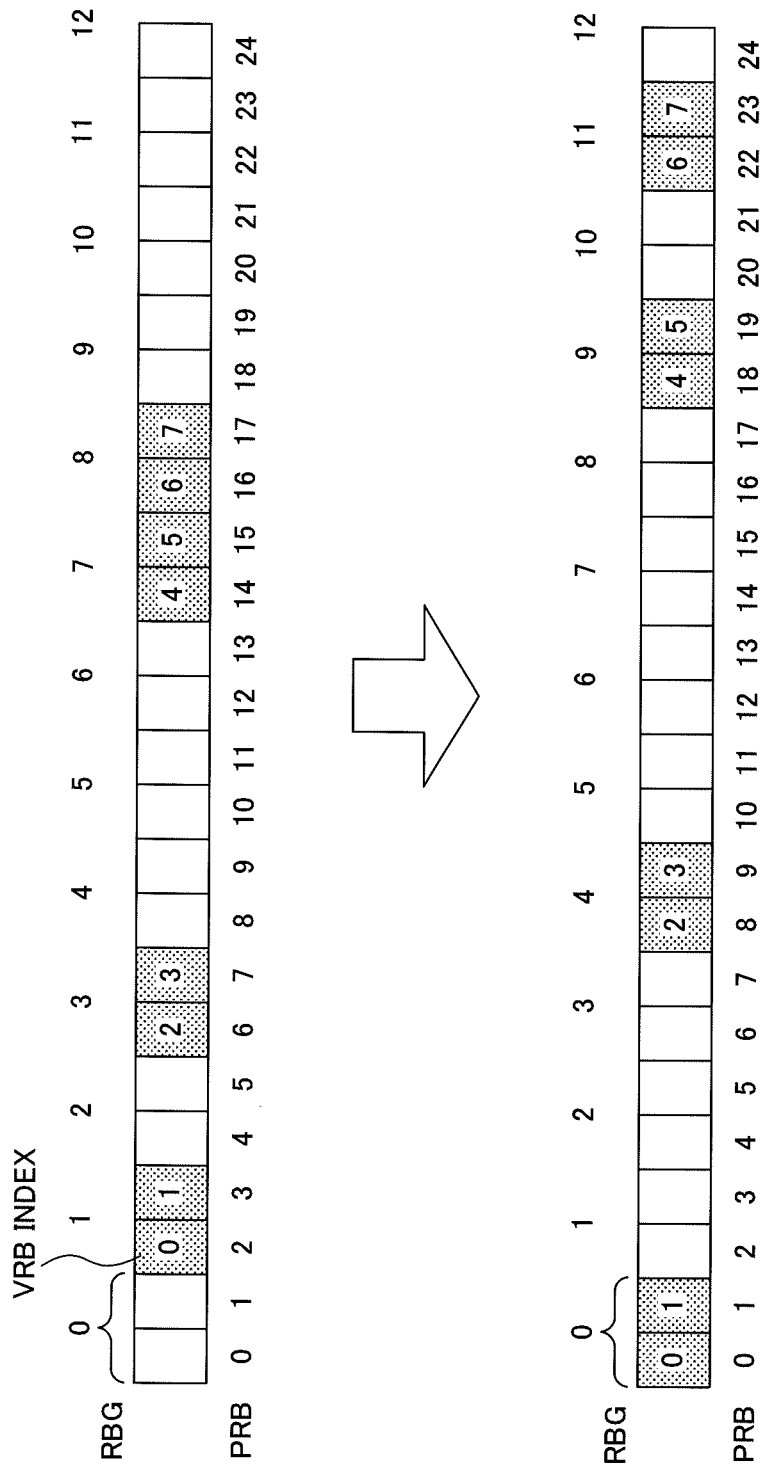
FIG. 10 shows an example of a fourth mapping method to use frequency hopping.

FIG. 10 shows an example of a fourth mapping method to use frequency hopping. The fourth mapping method is a method of applying frequency hopping to VRB setting positions on each subframe. Although an example of a case where the resource allocation type is 0 is shown here, this is by no means limiting. VRBs are mapped to the PRBs for setting VRBs, and each VRB is numbered by a VRB index. The VRB setting positions are subject to frequency hopping, in RBG units, on each subframe.

For example, in a given subframe, PRBs for setting VRBs are set in RBGs #1, #3, #7 and #8. In the next subframe, PRBs for setting VRBs are subject to frequency hopping, from RBG #1 to RBG #0, from RBG #3 to RBG #4, from RBG #7 to RBG #9, and from RBG #8 to RBG #11. In this case, it is equally possible to apply frequency hopping, in RBG units, in cell-specific patterns. With the fourth mapping method, it is possible to achieve a frequency diversity effect by combining with the first to third mapping methods.

Note that the fourth mapping method has only to be a method to shift the VRB setting positions in the frequency direction per predetermined time unit. For example, as a predetermined time unit, it is possible to apply frequency hopping to the VRB setting positions every several subframes (for example, every two subframes), every slot, and so on. Also, as the amount of shift in the frequency direction, frequency hopping may be applied in PRB units or in units of several PRBs (for example, in three-PRB units).

Figure 11:
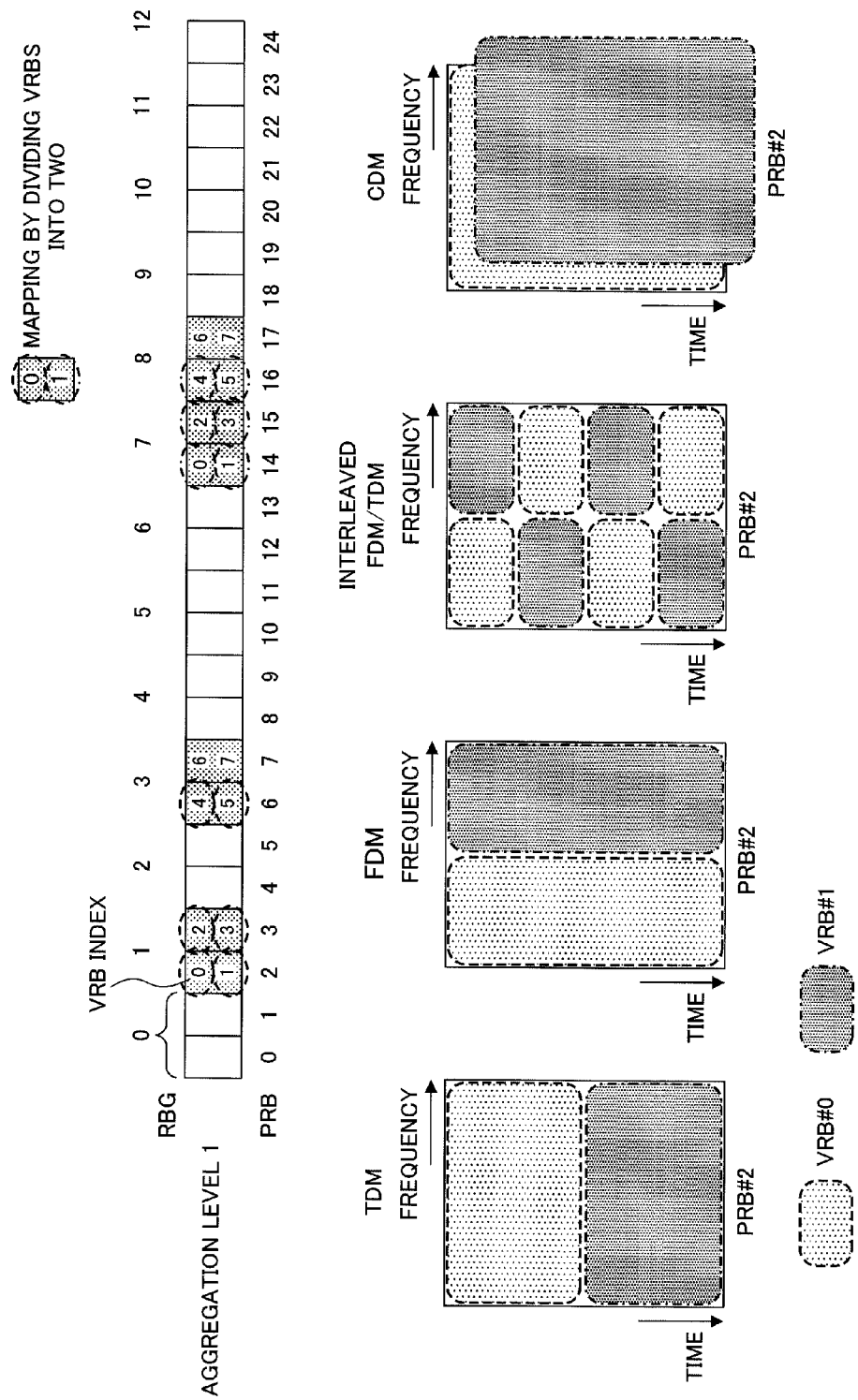
FIG. 11 is a diagram to explain a VRB multiplexing method.
Figure 12:
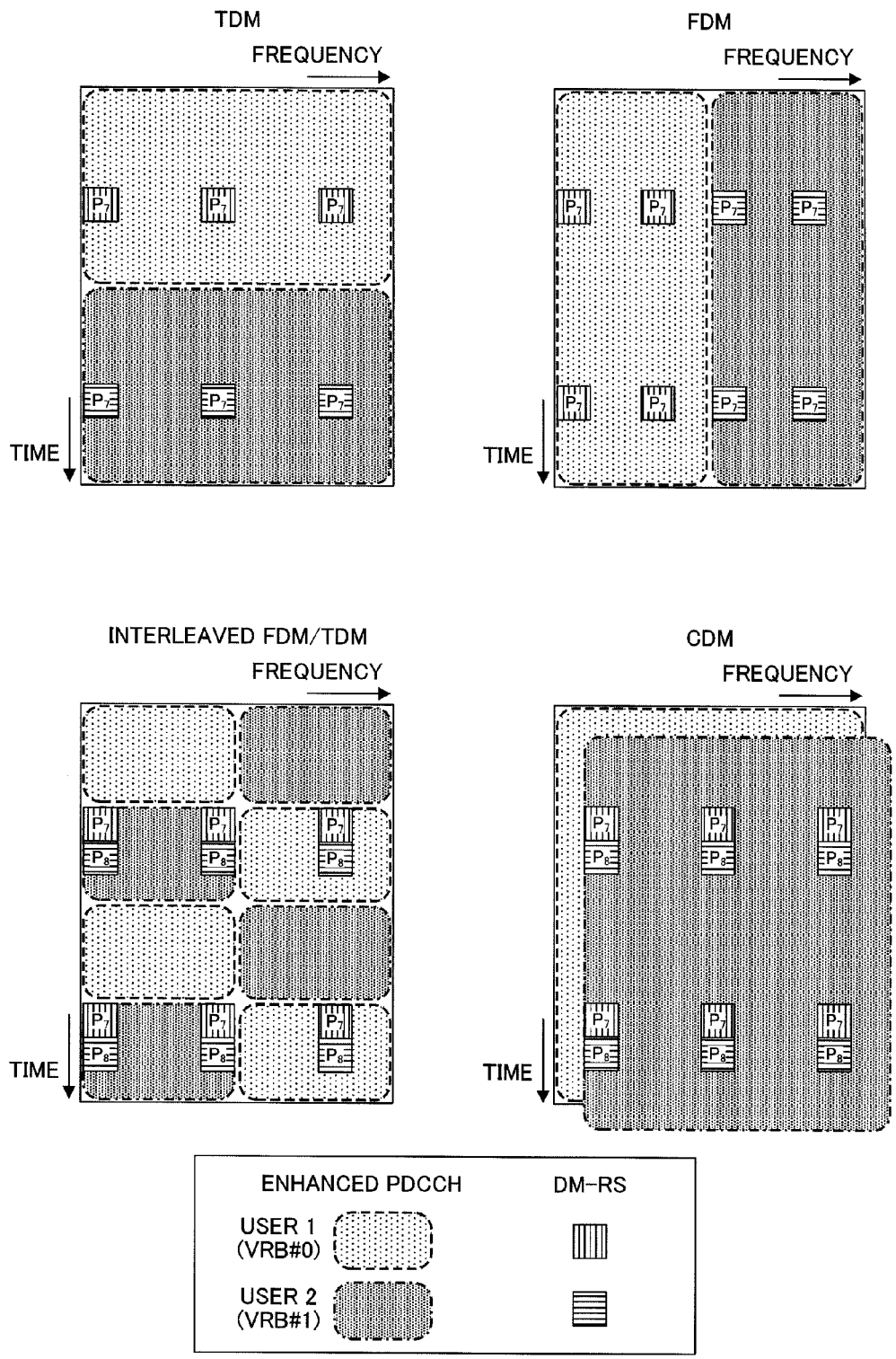
FIG. 12 is a diagram to explain and show an example of DM-RS allocation in a VRB multiplexing method.
Figure 13:
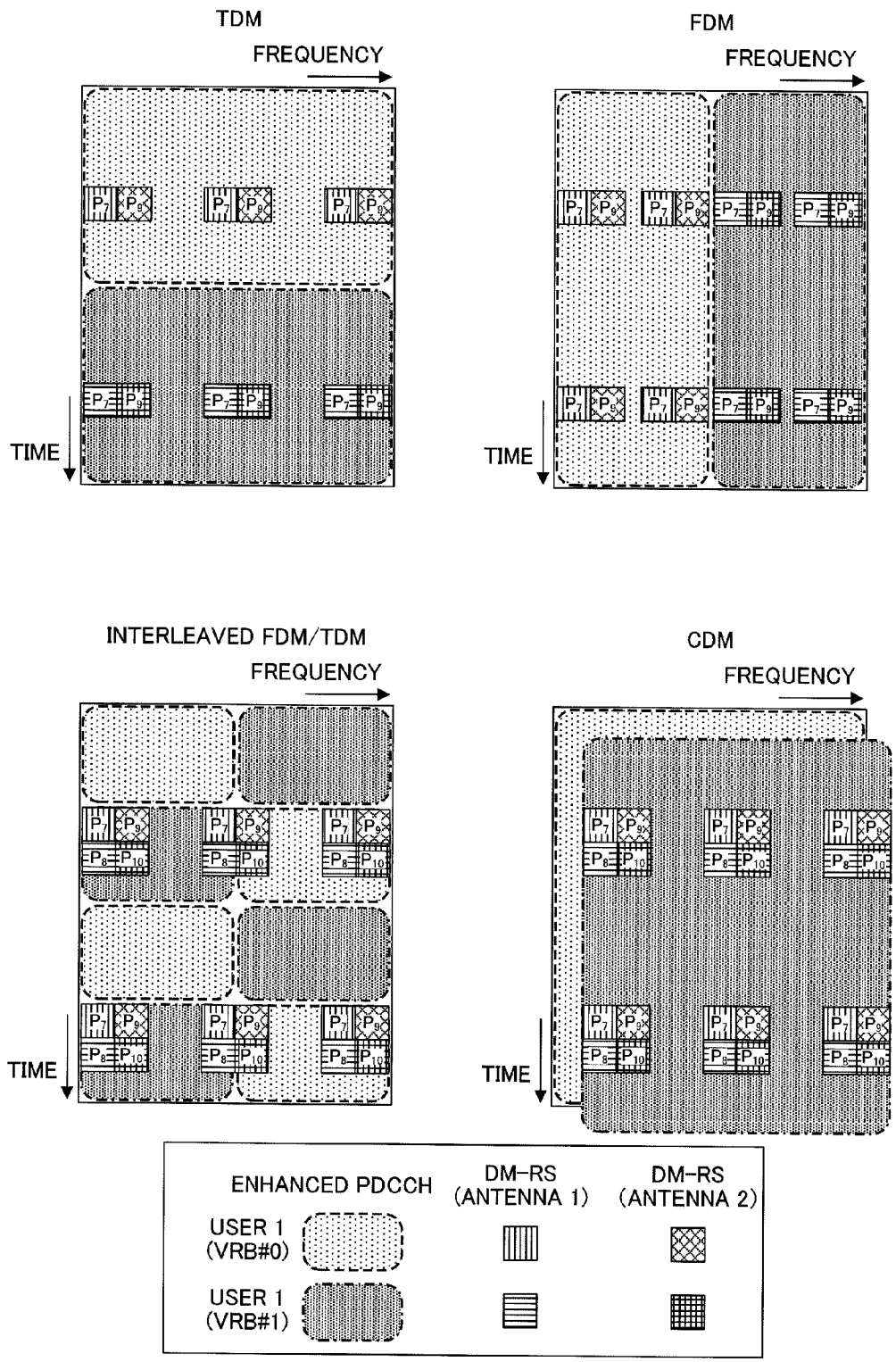
FIG. 13 is a diagram to explain and show an example of DM-RS allocation where transmission diversity is applied to a VRB multiplexing method.

When the above first and second mapping methods are used, it is necessary to multiplex a plurality of VRBs in the same PRB. Here, the method of multiplexing VRBs according to the present embodiment will be described. FIG. 11 to FIG. 13 are diagrams to explain and show examples of the VRB multiplexing method according to the present embodiment. Although FIG. 11 to FIG. 13 show examples of a case where the resource allocation type is 0, the aggregation level is 1 and VRBs are divided into two, this is by no means limiting. As for the VRB multiplexing method, there are TDM (Time Division Multiplex), FDM (Frequency Division Multiplex), interleaved FDM/TDM, CDM (Code Division Multiplex) and so on. However, the VRB multiplexing method is not limited to these and any multiplexing method as long as VRBs can be multiplexed. Note that the division of VRBs is not limited to dividing the region of VRBs and may also include dividing (duplicating) the functions of VRBs.

As shown in FIG. 11, for example, PRB #2 is divided into two in the time direction, and VRB #0 and VRB #1 are multiplexed. In FDM, for example, PRB #2 is divided into two in the frequency direction, and VRB #0 and VRB #1 are multiplexed. In interleaved FDM/TDM, for example, PRB

2 is divided into several in the time direction and the frequency direction, and VRB #0 and VRB #1 are multiplexed. In this case, VRB #0 and VRB #1 are arranged to be orthogonal to each other in the time direction and the frequency direction, in PRB #2. In CDM, for example, in PRB #2, VRB #0 and VRB #1 are multiplexed by a spreading code.

At aggregation level 1, cases might occur where downlink control information of different users is allocated to a plurality of VRBs that are multiplexed in the same PRB. In this case, it is necessary to allocate a DM-RS for channel estimation, to each user. For example, DM-RSs of maximum eight layers (antenna ports 7 to 14), defined in Rel. 10, may be used, but this is by no means limiting. As shown in FIG. 12, in TDM, DM-RSs are allocated in each region that is given by dividing PRBs into two in the time direction. For example, the first-half DM-RS of the antenna port 7 in the time direction is allocated to VRB #0, and the second-half DM-RS of the antenna port 7 in the time direction is allocated to VRB #1. In FDM, DM-RSs are allocated in each region that is given by dividing PRBs into two in the frequency direction. For example, the DM-RS of the antenna port 7 of the lower frequency side in the frequency direction is allocated to VRB #0, and the DM-RS of the antenna port 7 of the higher frequency side in the frequency direction is allocated to VRB #1. Note that, in these cases, DM-RS transmission weights are changed per user (per region).

In interleaved FDM/TDM, a plurality of VRBs are arranged alternately over all of the PRBs, in the time direction and the frequency direction, so that a different antenna port is allocated to each user. For example, the DM-RS of the antenna port 7 is allocated to VRB #0, and the DM-RS of the antenna port 8 is allocated to VRB #1. In CDM, a plurality of VRBs are arranged in a distributed manner over all of the PRBs, so that a different antenna port is allocated to each user. For example, the DM-RS of the antenna port 7 is allocated to VRB #0, and the DM-RS of the antenna port 8 is allocated to VRB #1. In interleaved FDM/TDM and CDM, the antenna port 7 is used upon demodulating the downlink control information of VRB #0, and the antenna port 8 is used upon demodulating the downlink control information of VRB #1. Note that the antenna port 7 alone may be used at aggregation level 2 or higher. Note that, although, in FIG. 12, the antenna port 7 and the antenna port 8 are arranged in the time direction for ease of explanation, multiplexing by CDM is equally possible.

As shown in FIG. 13, when transmission diversity is furthermore used, the DM-RSs of a plurality of antenna ports are required, for each user. In this case, each user may be limited to two antenna ports, taking into account the increase of overhead. In TDM, DM-RSs are allocated in each region that is given by dividing PRBs into two in the time direction. For example, the first-half DM-RSs of the antenna ports 7 and 9 in the time direction are allocated to VRB #0, and the second-half DM-RSs of the antenna ports 7 and 9 in the time direction are allocated to VRB #1. In FDM, DM-RSs are allocated in each region that is given by dividing PRBs into two in the frequency direction. For example, the first-half DM-RSs of the antenna ports 7 and 9 of the lower frequency side in the frequency direction are allocated to VRB #0, and the second-half DM-RSs of the antenna ports 7 and 9 of the higher frequency side in the frequency direction are allocated to VRB #1.

In interleaved FDM/TDM, a plurality of VRBs are arranged alternately over all of the PRBs, in the time direction and the frequency direction, so that a different antenna port is allocated to each user. For example, the DM-RSs of the antenna ports 7 and 9 are allocated to VRB #0, and the DM-RSs of the antenna ports 8 and 10 are allocated to VRB #1. In CDM, a plurality of VRBs are arranged in a distributed manner over all of the PRBs, so that a different antenna port is allocated to each user. For example, the DM-RSs of the antenna ports 7 and 9 are allocated to VRB #0, and the DM-RSs of the antenna ports 8 and 10 are allocated to VRB #1. In interleaved FDM/TDM and CDM, the antenna ports 7 and 9 are used upon demodulating the downlink control information of VRB #0, and the antenna ports 8 and 10 are used upon demodulating the downlink control information of VRB #1. Note that the antenna ports 7 and 9 alone may be used at aggregation level 2 or higher. Note that, although, in FIG. 13, the antenna ports 7 to 10 are arranged in the time direction and the frequency direction for ease of explanation, multiplexing by CDM and FDM is equally possible.

When a plurality of VRBs are multiplexed in the same PRB using interleaved FDM/TDM, the method of determining the interleaving pattern is not particularly limited. For example, as an interleaving pattern, a fixed pattern that is defined in advance between a base station apparatus and a mobile terminal apparatus may be used. Also, it is possible to select one of a plurality of patterns that are prepared in advance as an interleaving pattern. In this case, the base station apparatus reports the selected interleaving pattern to the mobile terminal apparatus, or a mobile station may perform blind decoding using a plurality of patterns. Also, it is equally possible to determine interleaving patterns based on cell IDs, subframe indices, PRB indices, the antenna port indices of DM-RSs, and so on.

When a plurality of VRBs are multiplexed in the same PRB using CDM, the method of determining an orthogonal code and a scrambling code is not particularly limited. For example, as an orthogonal code, time domain spreading, frequency domain spreading, and two-dimensional (time domain/frequency domain) spreading may be used. Also, it is possible to select one of a plurality of codes that are prepared in advance as a scrambling code. In this case, the base station apparatus may report the selected scrambling code to the mobile terminal apparatus, or a mobile station may perform blind decoding using a plurality of scrambling codes. Also, it is equally possible to determine scrambling codes based on cell IDs, subframe indices, PRB indices, the antenna port indices of DM-RSs and so on. Also, a configuration to use an orthogonal code alone, without using a scrambling code, is also possible. On the other hand, a configuration to use a scrambling code alone, without using an orthogonal code, is equally possible.

Figure 14:
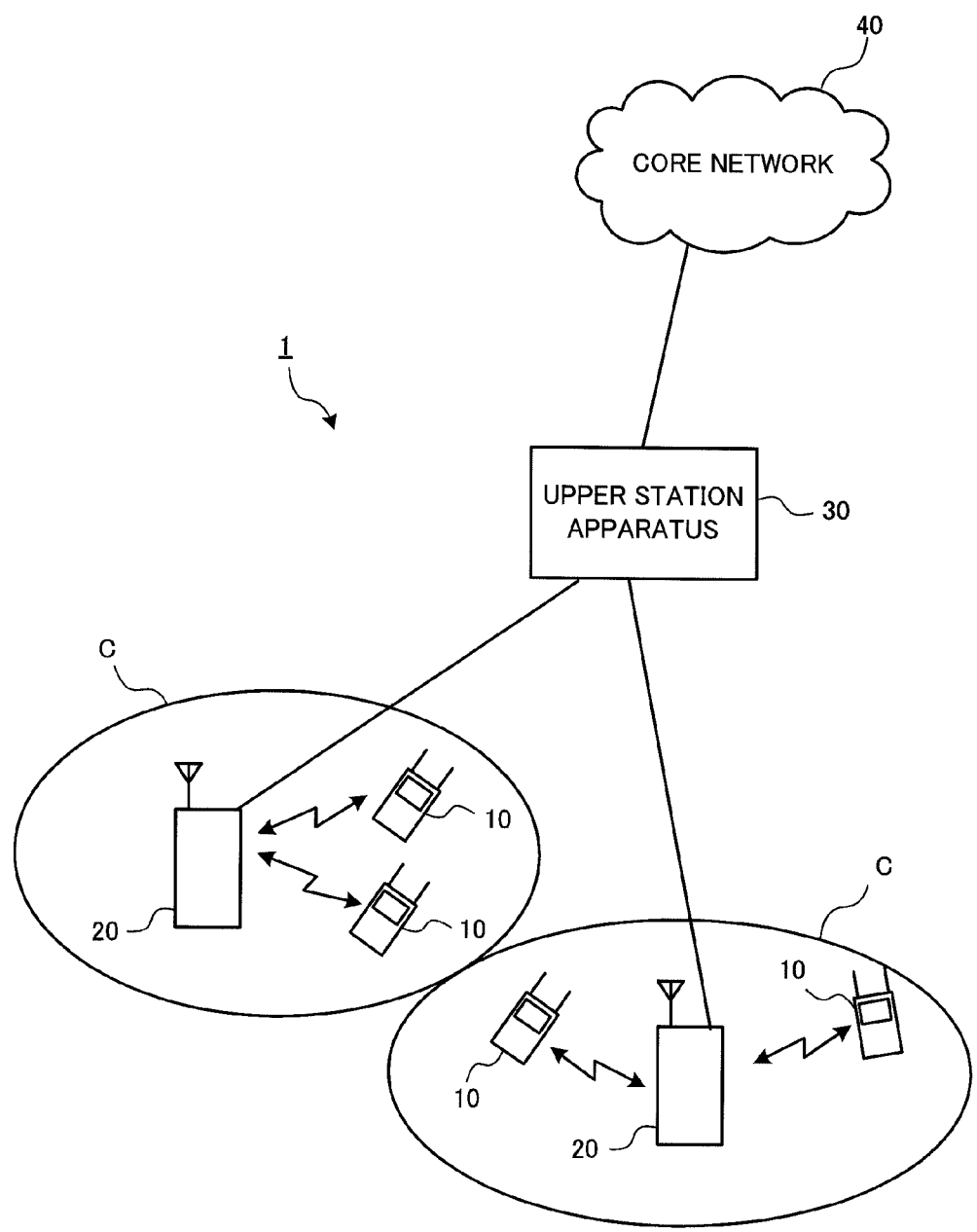
FIG. 14 is a diagram to explain a system configuration of a radio communication system.

Now, a radio communication system according to the present embodiment will be described in detail. FIG. 14 is a diagram to explain a system configuration of a radio communication system according to the present embodiment. Note that the radio communication system shown in FIG. 14 is a system to accommodate, for example, an LTE system or its successor system. This radio communication system uses carrier aggregation, which makes a plurality of fundamental frequency blocks, in which the system band of the LTE system is one unit, as one. This radio communication system may be referred to as "IMT-Advanced" or may be referred to as "4G."

As shown in FIG. 14, a radio communication system 1 is configured to include a base station apparatus 20 and a plurality of mobile terminal apparatuses 10 that communicate with this base station apparatus 20. The base station apparatus 20 is connected with an upper station apparatus 30, and this upper station apparatus 30 is connected with a core network 40. Also, the base station apparatuses 20A and 20B are connected with each other by wire connection or by wireless connection. The mobile terminal apparatuses 10 are able to communicate with the base station apparatus 20 in a cell 50. Note that the upper station apparatus 30 includes, for example, an access gateway apparatus, a radio network controller (RNC), a mobility management entity (MME) and so on, but is by no means limited to these.

Although each mobile terminal apparatus 10 may be either an LTE terminal or an LTE-A terminal, in the following description, simply a mobile terminal apparatus will be described, unless specified otherwise. Also, although the mobile terminal apparatus 10 performs radio communication with the base station apparatus 20 for ease of explanation, more generally, user apparatuses (UEs: User Equipment) including mobile terminal apparatuses and fixed terminal apparatuses may be used.

In the radio communication system 1, although, as radio access schemes, OFDMA (Orthogonal Frequency Division Multiple Access) is applied to the downlink and SC-FDMA (Single-Carrier Frequency-Division Multiple Access) is applied to the uplink, the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared CHannel), which is a downlink data channel that is used by each mobile terminal apparatus 10 on a shared basis, downlink L1/L2 control channels (PDCCH, PCFICH, PHICH), and an enhanced PDCCH, which is an expanded PDCCH. User data and higher control information are transmitted by means of the PDSCH. PDSCH and PUSCH scheduling information and so on are transmitted by the PDCCH (Physical Downlink Control CHannel). The number of OFDM symbols to use for the PDCCH is transmitted by the PCFICH (Physical Control Format Indicator Channel). HARQ ACK and NACK in response to the PUSCH are transmitted by the PHICH (Physical Hybrid-ARQ Indicator CHannel).

PDSCH and PUSCH scheduling information and so on are transmitted by means of the enhanced PDCCH. The enhanced PDCCH is used to support the shortage of PDCCH capacity using the resource region where the PDSCH is allocated.

Uplink communication channels include a PUSCH (Physical Uplink Shared CHannel), which is an uplink data channel used by each mobile terminal apparatus on a shared basis, and a PUCCH (Physical Uplink Control CHannel), which is an uplink control channel. User data and higher control information are transmitted by means of this PUSCH. Also, by means of the PUCCH, downlink radio quality information (CQI: Channel Quality Indicator), ACK/NACK and so on are transmitted.

Figure 15:
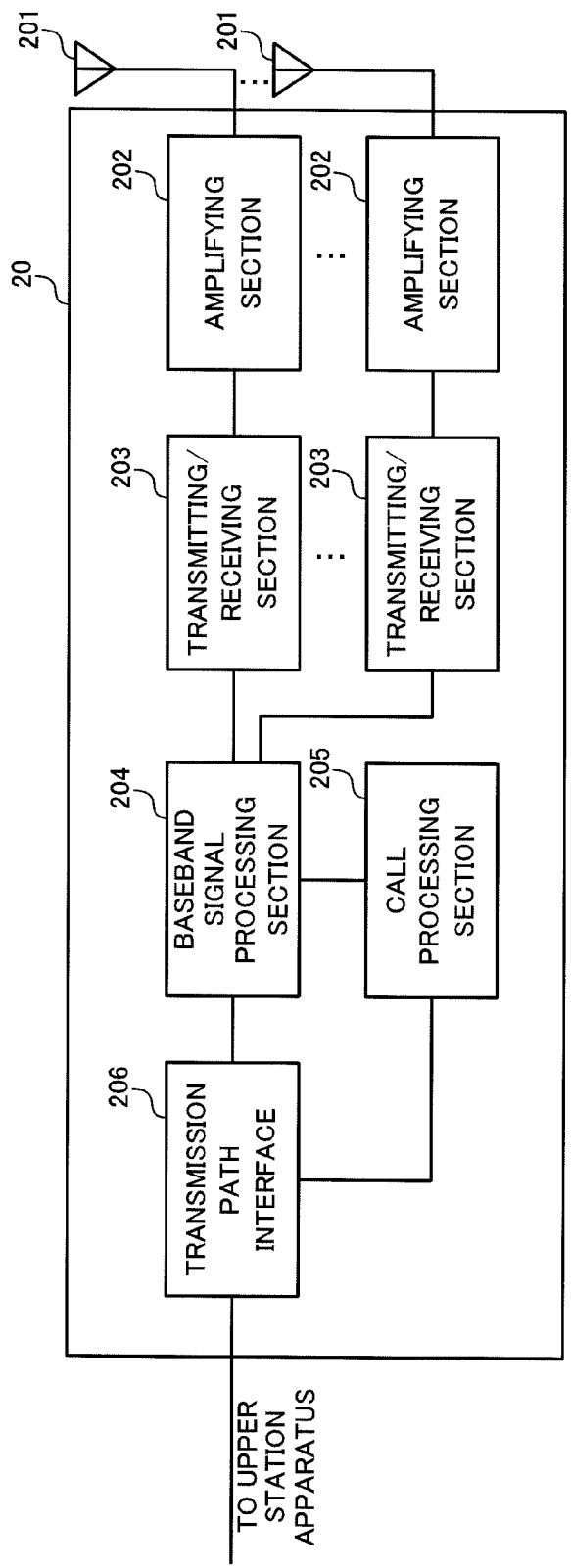
FIG. 15 is a diagram to explain an overall configuration of a base station apparatus.

Referring to FIG. 15, an overall configuration of a base station apparatus according to the present embodiment will be described. A base station apparatus 20 has a plurality of transmitting/receiving antennas 201 for MIMO transmission, an amplifying section 202, a transmitting/receiving section (transmitting section) 203, a baseband signal processing section 204, a call processing section 205, and a transmission path interface 206.

User data to be transmitted from the base station apparatus 20 to the mobile terminal apparatus 10 on the downlink is input from the higher station apparatus 30, into the baseband signal processing section 204, via the transmission path interface 206.

In the baseband signal processing section 204, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process are performed, and the result is transferred to each transmitting/receiving section 203. Furthermore, signals of a downlink control channel are also subjected to transmission processes such as channel coding and an inverse fast Fourier transform, and are transferred to each transmitting/receiving section 203.

Also, the baseband signal processing section 204 reports, to the mobile terminal apparatus 10, control information to allow communication in that cell, by a broadcast channel. The information for communication in the cell includes, for example, the uplink or downlink system bandwidth, resource block information allocated to the mobile terminal apparatus 10, precoding information for precoding in the mobile terminal apparatus 10, identification information of a root sequence (root sequence index) for generating random access preamble signals in the PRACH (Physical Random Access Channel), and so on. The precoding information may be transmitted via an independent control channel such as the PHICH.

The transmitting/receiving section 203 converts the baseband signal, which has been subjected to precoding and is output from the baseband signal processing section 204 per antenna, into a radio frequency band. The amplifying section 202 amplifies the radio frequency signal having been subjected to frequency conversion and transmits the result from the transmitting/receiving antennas 201.

Meanwhile, as for data to be transmitted on the uplink from the mobile terminal apparatus 10 to the base station apparatus 20, a radio frequency signal that is received in each transmitting/receiving antenna 201 is amplified in the amplifying section 202, subjected to frequency conversion and converted into a baseband signal in each transmitting/receiving section 203, and is input in the baseband signal processing section 204.

The baseband signal processing section 204 performs an FFT process, an IDFT process, error correction decoding, a MAC retransmission control receiving process, and RLC layer and PDCP layer receiving processes, of the user data that is included in the received baseband signal, and the result is transferred to the upper station apparatus 30 via the transmission path interface 206.

The call processing section 205 performs call processing such as setting up and releasing communication channels, manages the state of the base station apparatus 20 and manages the radio resources.

Figure 16:
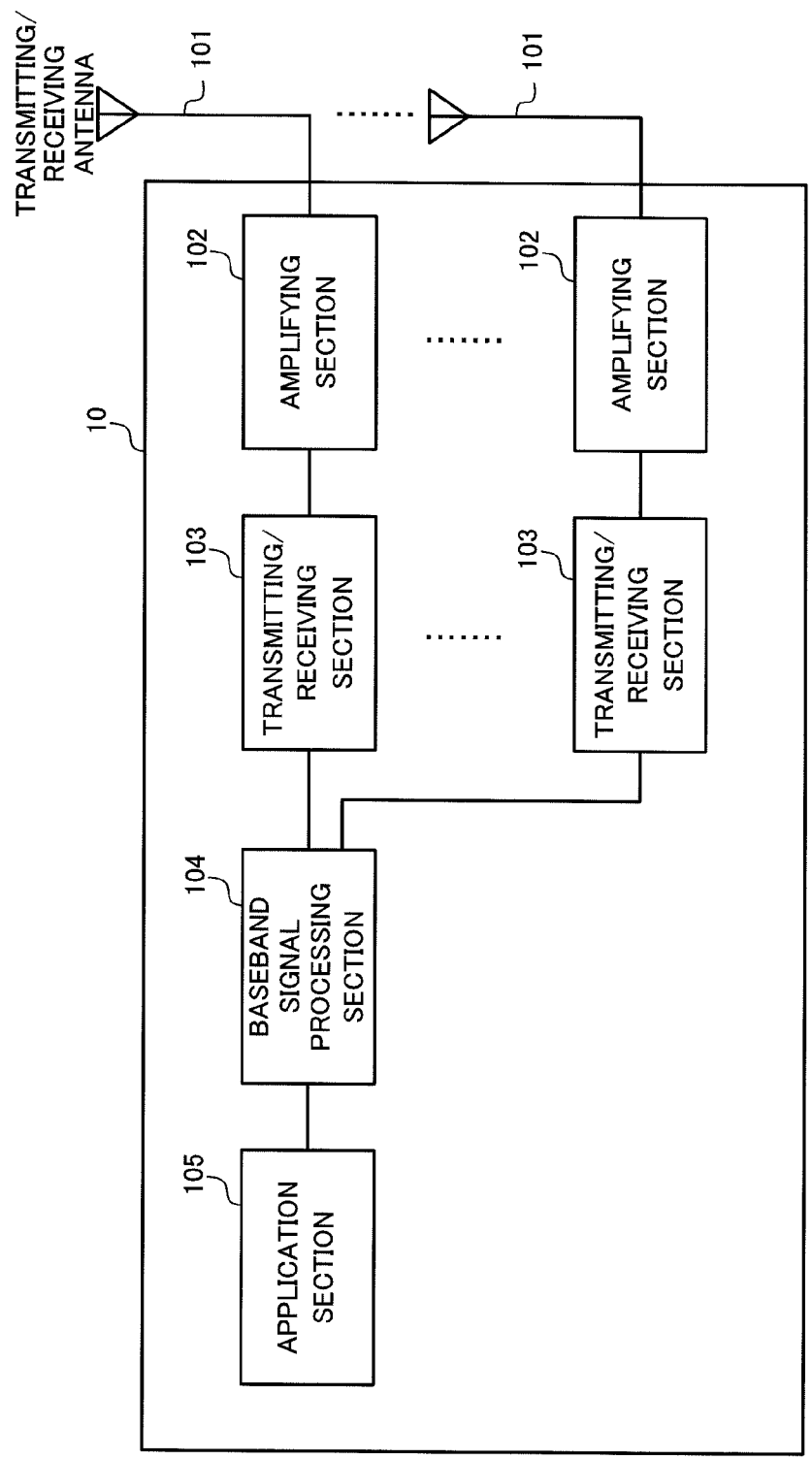
FIG. 16 is a diagram to explain an overall configuration of a mobile terminal apparatus.

Next, referring to FIG. 16, an overall configuration of a mobile terminal apparatus according to the present embodiment will be described. An LTE terminal and an LTE-A terminal have the same hardware configurations in principle parts, and therefore will be described indiscriminately. The mobile terminal apparatus 10 has a plurality of transmitting/receiving antennas 101 for MIMO transmission, an amplifying section 102, a transmitting/receiving section (receiving section) 103, a baseband signal processing section 104, and an application section 105.

As for downlink data, radio frequency signals that are received in a plurality of transmitting/receiving antennas 101 are each amplified in the amplifying section 10, subjected to frequency conversion and converted into a baseband signal in the transmitting/receiving section 10. This baseband signal is subjected to receiving processes such as an FFT process, error correction decoding and retransmission control, in the baseband signal processing section 104. In this downlink data, downlink user data is transferred to the application section 105. The application section 105 performs processes related to upper layers above the physical layer and the MAC layer. Also, in the downlink data, broadcast information is also transferred to the application section 10.

Meanwhile, uplink user data is input from the application section 105 into the baseband signal processing section 104. The baseband signal processing section 104 performs a retransmission control (HARQ (Hybrid ARQ)) transmission process, channel coding, precoding, a DFT process, an IFFT process and so on, and the result is transferred to each transmitting/receiving section 103. The baseband signal that is output from the baseband signal processing section 104 is converted into a radio frequency band in the transmitting/receiving section 103. After that, the amplifying section 102 amplifies the radio frequency signal having been subjected to the frequency conversion, and transmits the result from the transmitting/receiving antennas 101.

Figure 17:
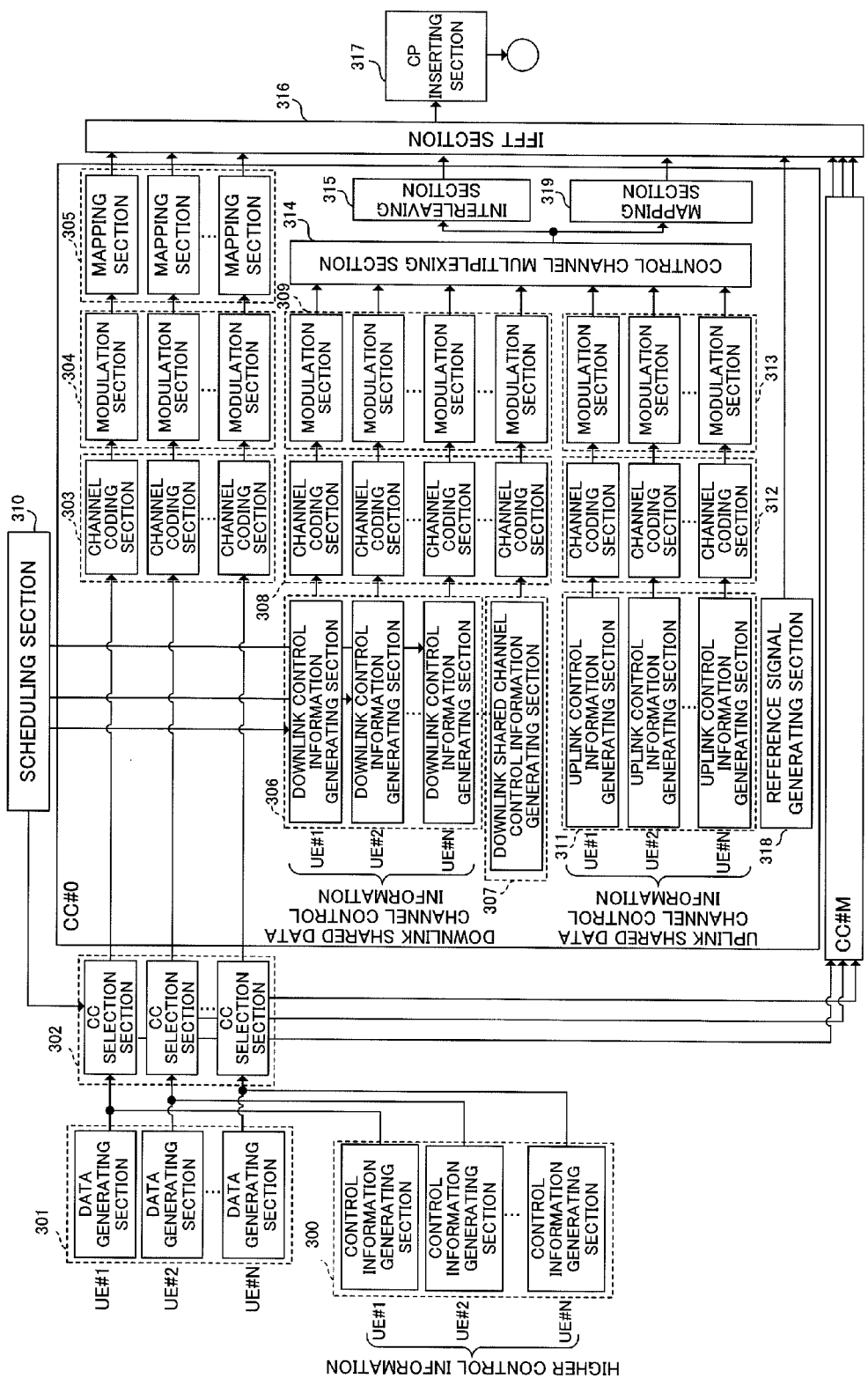
FIG. 17 is a functional block diagram of a baseband signal processing section provided in a base station apparatus and part of higher layers.

FIG. 17 is a functional block diagram of a baseband signal processing section 204 provided in the base station apparatus 20 according to the present embodiment and part of the higher layers, and primarily illustrates the function blocks for transmission processes in the baseband signal processing section 204. FIG. 17 shows an example of a base station configuration which can support the maximum number of component carriers M (CC #0 to CC #M). Transmission data for the mobile terminal apparatus 10 under the base station apparatus 20 is transferred from the upper station apparatus 30 to the base station apparatus 20.

Control information generating sections 300 generate higher control information for performing higher layer signaling (for example, RRC signaling), for each user. Also, higher control information may include resource blocks (PRB positions) where an enhanced PDCCH (FDM-type PDCCH) can be mapped in advance.

Data generating sections 301 output transmission data transferred from the upper station apparatus 30, as user data, for each user. Component carrier selection sections 302 select, for each user, component carriers to use for radio communication with the mobile terminal apparatus 10.

A scheduling section 310 controls allocation of component carriers to a serving mobile terminal apparatus 10 according to the overall communication quality of the system band. Also, the scheduling section 310 controls the resource allocation in component carriers CC #1 to CC #M. LTE terminal users and LTE-A terminal users are scheduled separately. The scheduling section 310 receives as input the transmission data and retransmission command from the higher station apparatus 30, and also receives as input the channel estimation values and resource block CQIs from the receiving section having measured an uplink received signal.

The scheduling section 310 schedules uplink and downlink control information and uplink and downlink shared channel signals, with reference to the retransmission command, channel estimation value and CQI that have been received as input. A propagation path in mobile communication varies differently per frequency, due to frequency selective fading. So, for user data for each mobile terminal apparatus 10, the scheduling section 310 designates resource blocks (mapping positions) of good communication quality, on each subframe (which is referred to as "adaptive frequency scheduling"). In adaptive frequency scheduling, for each resource block, a mobile terminal apparatus 10 of good propagation path quality is selected. Consequently, the scheduling section 310 designates resource blocks (mapping positions), using the CQI of each resource block, fed back from each mobile terminal apparatus 10.

Likewise, the scheduling section 310 designates resource blocks (mapping positions) of good communication quality, on each subframe, with respect to control information transmitted by the enhanced PDCCH, by adaptive frequency scheduling. Consequently, the scheduling section 310 designates resource blocks (mapping positions) using the CQI of each resource block, fed back from each mobile terminal apparatus 10.

Also, the scheduling section 310 controls the number of aggregations according to the conditions of the propagation path with the mobile terminal apparatus 10. In the event of the PDCCH, the number of CCE aggregations is controlled, and, in the event of the enhanced PDCCH, the number of VRB aggregations is controlled. For cell edge users, the number of CCE aggregations and the number of VRB aggregations are increased. Also, the MCS (coding rate and modulation scheme) that fulfills a required block error rate with the assigned resource blocks is determined. Parameters to fulfill the MCS (coding rate and modulation scheme) determined by the scheduling section 310 are set in the channel coding sections 303, 308 and 312, and in the modulation sections 304, 309 and 313.

The baseband signal processing section 204 has channel coding sections 303, modulation sections 304, and mapping sections 305, to match the maximum number of users to be multiplexed, N, in one component carrier. The channel coding sections 303 perform channel coding of the shared data channel (PDSCH), which is formed with user data (including part of higher control signals) that is output from the data generating section 301, for each user. The modulation sections 304 modulate user data having been subjected to channel coding, for each user. The mapping sections 305 map the modulated user data to radio resources.

Also, the baseband signal processing section 204 has a downlink control information generating section (generating section) 306 that generates downlink shared data channel control information, which is user-specific downlink control information, and a downlink shared channel control information generating section 307 that generates downlink shared control channel control information, which is downlink control information that is common between users.

The downlink control information generating section 306 generates downlink shared data channel control information (DL assignment and so on) for controlling the downlink shared data channel (PDSCH). This downlink shared data channel control information is generated for each user.

The baseband signal processing section 204 has channel coding sections 308 and modulation sections 309 to support the maximum number of users to multiplex, N, in one component carrier. The channel coding sections 308 perform channel coding of control information that is generated in the downlink control information generating sections 306 and the downlink shared channel control information generating section 307, for each user. The modulation sections 309 modulate the downlink control information after channel coding.

Also, the baseband signal processing section 204 has uplink control information generating sections (generating sections) 311, channel coding sections 312, and modulation sections 313. The uplink control information generating sections 311 generate uplink shared data channel control information (UL grant and so on) for controlling the uplink shared data channel (PUSCH). The uplink shared data channel control information is generated for each user.

The control information that has been modulated for each user in the above modulation sections 309 and 313 is multiplexed in a control channel multiplexing section 314. Downlink control information for the PDCCH is multiplexed on the top three OFDM symbols of a subframe and interleaved in an interleaving section 315. Meanwhile, downlink control information for the enhanced PDCCH (FRM-type PDCCH) is multiplexed on the data region of the subframe, and mapped to the resource blocks (PRBs) in the mapping section (allocation section) 319. In this case, the mapping section 319 performs mapping using the first to fourth mapping methods based on commands from the scheduling section 310.

With the first mapping method, VRBs are divided into several, and the VRBs of a relatively low frequency band side and the VRBs of a relatively high frequency band side are numbered in order, from one end in the frequency direction. By this means, the VRBs of the lower frequency band side and the VRBs of the higher frequency band side are associated with each other, toward one direction, in the frequency direction. The mapping section 319 maps downlink control information to the associated VRBs, based on the aggregation level and mapping positions (VRB indices) determined in the scheduling section 310. As a result of this, downlink control information is mapped to a relatively low frequency band side and a relatively high frequency band side, in a distributed manner.

With the second mapping method, VRBs are divided into two, and the VRBs of a relatively low frequency band side are numbered in order from one end in the frequency direction, and the VRBs of a relatively high frequency band side are numbered in order from the other end in the frequency direction. By this means, the VRBs of the lower frequency band side and the VRBs of the higher frequency band side are associated with each other, in order, from both ends in the frequency direction. The mapping section 319 maps downlink control information to the associated VRBs, based on the aggregation level and mapping positions (VRB indices) determined in the scheduling section 310. As a result of this, downlink control information is mapped to a relatively low frequency band side and a relatively high frequency band side, in a distributed manner.

With the third mapping method, VRBs of a relatively low frequency band side and VRBs of a relatively high frequency band side are numbered alternately by VRB indices. The mapping section 319 maps downlink control information, based on the aggregation level and mapping positions (VRB indices) determined in the scheduling section 310. In the event of aggregation level 2 or higher, aggregated downlink control information is divided into two, and is mapped to a relatively low frequency band side and a relatively high frequency band side, in a distributed manner.

With the fourth mapping method, VRB setting positions are subject to frequency hopping on each subframe. The mapping section 319 maps downlink control information based on the aggregation level and mapping positions (VRB indices) determined in the scheduling section 310. In this case, the fourth mapping method may be used in combination with the above first to third mapping methods.

Note that, when the first and second mapping methods are used, the mapping section 319 multiplexes a plurality of VRBs that are divided, in the same PRB, using VRB multiplexing methods. In this case, the mapping section 319 multiplexes a plurality of VRBs using TDM, FDM, interleaved FDM/TDM, and CDM. In this way, the mapping section 319 is able to allocate downlink control information to a relatively low frequency band side and a relatively high frequency band side, in a distributed manner, so that it is possible to achieve a frequency diversity effect and a transmission diversity effect. Note that the mapping section 319 may perform mapping using "with cross interleaving," in addition to "without cross interleaving."

The reference signal generating section 318 generates a cell-specific reference signal (CRS), which is used for various purposes such as channel estimation, symbol synchronization, CQI measurement, mobility measurement, and so on. Also, the reference signal generating section 318 generates a DM-RS, which is a user-specific downlink demodulation reference signal. The DM-RS is used not only to demodulate user data, but is also used to demodulate downlink control information transmitted by the enhanced PDCCH. This downlink control information is demodulated, using, for example, the DM-RSs of the antenna ports 7 to 10.

An IFFT section 316 receives as input a control signal from an interleaving section 315 and the mapping section 319, receives as input user data from the mapping section 305, and receives as input a reference signal from a reference signal generating section 318. The IFFT section 316 converts the downlink channel signal from a frequency domain signal into a time sequence signal by performing an inverse fast Fourier transform. A cyclic prefix inserting section 317 inserts cyclic prefixes in the time sequence signal of the downlink channel signal. Note that a cyclic prefix functions as a guard interval for cancelling the differences in multipath propagation delay. The transmission data to which cyclic prefixes have been added, is transmitted to the transmitting/receiving section 203.

Figure 18:
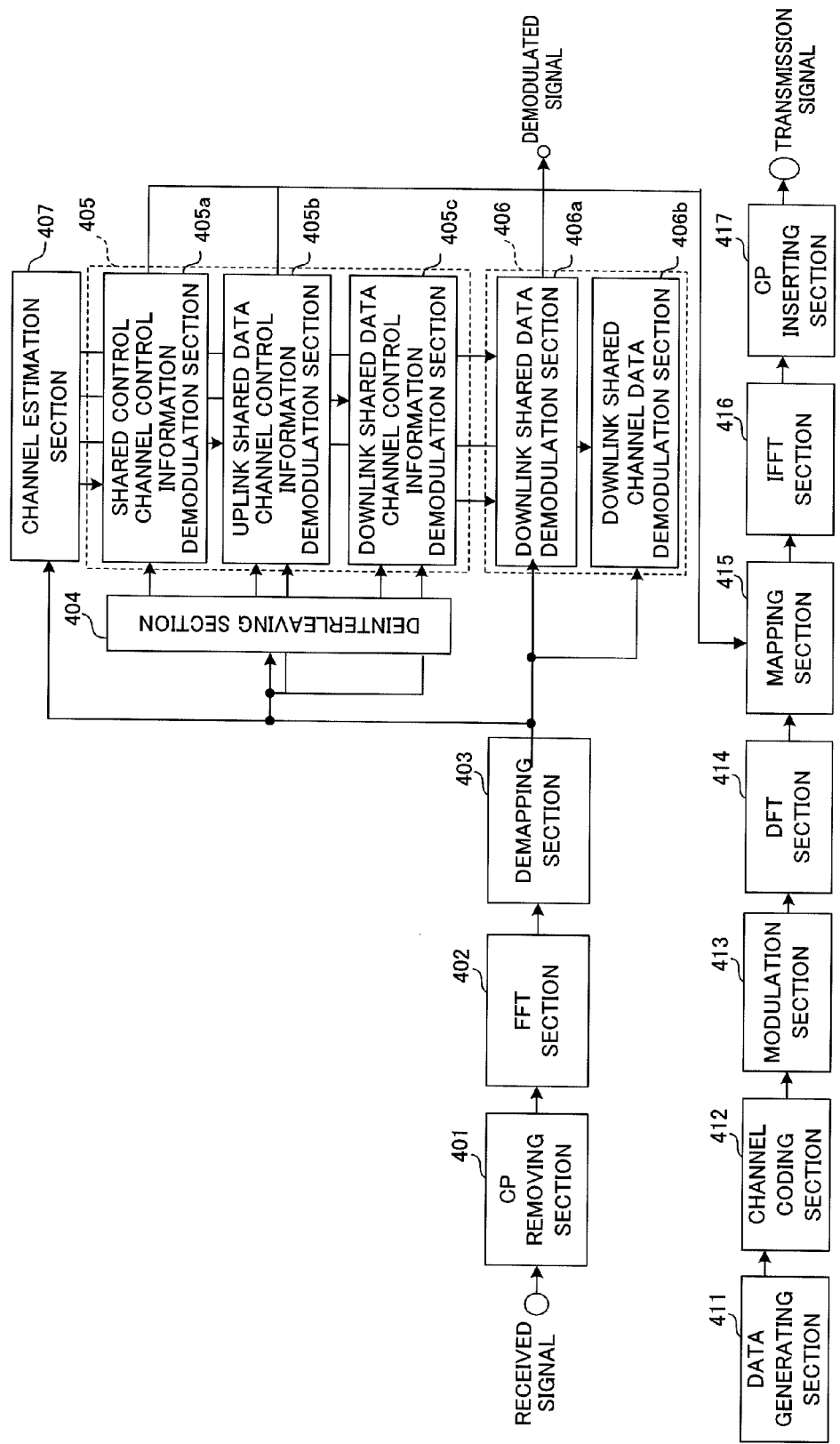
FIG. 18 is a functional block diagram of a baseband signal processing section provided in a mobile terminal apparatus.

FIG. 18 is a functional block diagram of a baseband signal processing section 104 provided in the mobile terminal apparatus 10, illustrating function blocks of an LTE-A terminal which supports LTE-A. First, the downlink configuration of the mobile terminal apparatus 10 will be described.

A downlink signal that is received as received data from the radio base station apparatus 20 has the CPs removed in the CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal in a demapping sections 403. The demapping section 403 demaps the downlink signal, and extracts, from the downlink signal, multiplex control information in which a plurality of pieces of control information are multiplexed, user data, and higher control information. Note that the demapping process by the demapping section 403 is performed based on higher control information that is received as input from the application section 105. The multiplex control information output from the demapping section 403 is deinterleaved in a deinterleaving section 404. Note that control information for the enhanced PDCCH is input in the control information demodulation section 405 via the deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 has a shared control channel control information demodulation section (demodulation section) 405*a* that demodulates downlink shared control channel control information from multiplex control information, an uplink shared data channel control information demodulation section (demodulation section) 405*b* that demodulates uplink shared data channel control information from multiplex control information, and a downlink shared data channel control information demodulation section 405*c* that demodulates downlink shared data channel control information from multiplex control information. The data demodulation section 406 includes a downlink shared data demodulation section 406*a* that demodulates the user data and higher control signals, and a downlink shared channel data demodulation section 406*b* that demodulates downlink shared channel data.

The shared control channel control information demodulation section 405*a* extracts shared control channel control information, which is control information that is common between users, by the blind decoding process, demodulation process, channel decoding process and so on of the common search space of the downlink control channel (PDCCH). The shared control channel control information includes downlink channel quality information (CQI), and therefore is input in a mapping section 415 (described later) and mapped as part of transmission data for the radio base station apparatus 20.

The uplink shared data channel control information demodulation section 405*b* extracts uplink shared data channel control information (for example, UL grant) by the blind decoding process, demodulation process, channel decoding process and so on of the user-specific search space of the downlink control channel (PDCCH). In this case, in the event of the normal PDCCH, the blind decoding process is performed with respect to a plurality of CCE candidates. Also, in the event of an enhanced PDCCH, which uses "without cross interleaving," the blind decoding process is performed with respect to a plurality of VRB candidates. The demodulated uplink shared data channel control information is input in the mapping section 415 and is used to control the uplink shared data channel (PUSCH).

The downlink shared data channel control information demodulation section 405*c* extracts downlink shared data channel control information (for example, DL assignment) by the blind decoding process, demodulation process, channel decoding process and so on of the user-specific search space of the downlink control channel (PDCCH). In this case, in the event of the normal PDCCH, the blind decoding process is performed with respect to a plurality of CCE candidates. Also, in the event of an enhanced PDCCH using "without cross interleaving," the blind decoding process is performed with respect to a plurality of VRB candidates. The demodulated downlink shared data channel control information is input in the downlink shared data demodulation section 406*a*, and is used to control the downlink shared data channel (PDSCH), and is input in the downlink shared data demodulating section 406*a*.

The downlink shared data modulation section 406*a* acquires user data and upper control information based on the downlink shared data channel control information input from the downlink shared data channel control information demodulation section 405*c*. The PRB positions (VRB positions) where the enhanced PDCCH included in the higher control information can be mapped are output to the downlink shared data channel control information demodulation section 405*c*. The downlink shared channel data demodulation section 406*b* demodulates downlink shared channel data based on the uplink shared data channel control information that is input from the uplink shared data channel control information demodulation section 405*b*.

The channel estimation section 407 performs channel estimation using the user-specific reference signal (DM-RS) or the cell-specific reference signal (CRS). In the event of demodulating the normal PDCCH, channel estimation is performed using the cell-specific reference signal. On the other hand, in the event of demodulating the enhanced PDCCH (FDM-type PDCCH) and user data, channel estimation is performed using the DM-RS and CRS. The estimated channel variation is output to the shared control channel control information demodulation section 405*a*, the uplink shared data channel control information demodulation section 405*b*, the downlink shared data channel control information demodulation section 405*c* and the downlink shared data demodulation section 406*a*. In these demodulation sections, demodulation processes are performed using estimated channel variation and reference signals for demodulation.

Also, when a plurality of VRBs of different users are multiplexed in the same PRB in the enhanced PDCCH by TDM or FDM, control information is demodulated using the antenna port 7. In this case, the DM-RSs in the same PRB are distinguished per user, by the transmission weights of the DM-RSs, which vary per user (per VRB). When a plurality of VRBs of different users are multiplexed in the same PRB in the enhanced PDCCH by interleaved FDM/TDM or CDM, control information is demodulated using the antenna ports 7 and 8. In this case, the DM-RSs in the same PRB are distinguished per user, by using a different antenna port for each user (VRB). Furthermore, when transmission diversity is applied, the DM-RSs in the same PRB are distinguished per user by the antenna ports and the transmission weights.

Note that, when a plurality of VRBs are multiplexed in the same PRB by interleaved FDM/TDM, the mobile terminal apparatus 10 needs an interleaving pattern. The interleaving pattern may be a fixed pattern that is determined in advance between the mobile terminal apparatus 10 and the base station apparatus 20. Also, the interleaving pattern may be a pattern that is selected from a plurality of patterns in base station apparatus 20. The selected pattern is reported from the base station apparatus 20 to the mobile terminal apparatus 10. Also, the interleaving pattern may be determined based on cell IDs, subframe indices and PRB indices.

When a plurality of VRBs are multiplexed in the same PRB by CDM, the mobile terminal apparatus 10 needs an orthogonal code and a scrambling code. For example, as an orthogonal code, time domain spreading, frequency domain spreading, and two-dimensional (time domain/frequency domain) spreading may be used. The orthogonal code may be determined in advance between the mobile terminal apparatus 10 and the base station apparatus 20 or may be reported from the base station apparatus to the mobile terminal apparatus 10. Also, the scrambling code may be a code that is selected from a plurality of codes in the base station apparatus 20. The selected scrambling code may be reported from the base station apparatus 20 to the mobile terminal apparatus 10. Also, it is equally possible to determine a scrambling code based on cell IDs, subframe indices, and PRB indices. Furthermore, a plurality of VRBs are multiplexed without a scrambling code, the mobile terminal apparatus 10 does not need a scrambling code.

The baseband signal processing section 104 has, as function blocks of the transmission process sequence, a data generating section 411, a channel coding section 412, a modulation section 413, a DFT section 414, a mapping section 415, an IFFT section 416, and a CP inserting section 417. The data generating section 411 generates transmission data from bit data that is received as input from the application section 105. The channel coding section 412 applies channel coding processes such as error correction to the transmission data, and the modulation section 413 modulates the transmission data having been subjected to channel coding by QPSK and so on.

The DFT section 414 performs a discrete Fourier transform on the modulated transmission data. The mapping section 415 maps the frequency components of the data symbol after the DFT, to the subcarrier positions designated by the base station apparatus 20. The IFFT section 416 converts the input data corresponding to the system band into time sequence data by performing an inverse fast Fourier transform, and the CP inserting section 417 inserts cyclic prefixes in the time sequence data in data units.

As described above, in a resource region for a downlink shared data channel (PDSCH), the base station apparatus 20 according to the present embodiment is able to allocate downlink control information to PRBs corresponding to VRBs of a relatively low frequency band side and VRBs of a relatively high frequency band side, in a distributed manner. Consequently, the base station apparatus 20 is able to cope with the shortage of downlink control channel capacity using a resource region for a downlink shared data channel (PDSCH). Also, since downlink control information is distributed between a relatively low frequency band side and a relatively high frequency band side, it is possible to reduce the influence of fading variation that is produced by movement of a mobile terminal apparatus and interference from other cells.

The present invention is by no means limited to the above embodiments and can be implemented in various modifications. For example, within the scope of the present invention, it is possible to change the allocation of VRBs, the number of VRB divisions, the number of processing sections, and the RBG size in the above descriptions, as appropriate. Besides, the present invention can be implemented with various changes, without departing from the scope of the present invention.

The disclosure of Japanese Patent Application No. 2011-103069, filed on May 2, 2011, including the specification, drawings and abstract, is incorporated herein by reference in its entirety.

The invention claimed is:

1. A base station apparatus comprising:
a baseband signal processor that generates downlink control signals for a mobile terminal apparatus that receives downlink signals using a resource region for downlink control signals and a resource region for downlink data signals;
wherein the baseband signal processor maps a plurality of virtual resources for downlink control signals to a plurality of physical resources that are arranged in a frequency direction in the resource region for downlink data signals, and allocates the downlink control signals to the virtual resources; and
a transmitter that transmits the downlink control signals allocated by the baseband signal processor,
wherein, when a multiplexing method of the virtual resources is CDM or interleaved FDM/TDM, antenna port numbers for demodulation reference signals used in demodulation of the downlink control signals are allocated per user.

2. The base station apparatus according to claim 1, wherein the virtual resources are allocated to the physical resources in a distributed manner in a time direction and the frequency direction.

3. The base station apparatus according to claim 2, wherein transmission diversity is applied.

4. The base station apparatus according to claim 1, wherein transmission diversity is applied.

5. The base station apparatus according to claim 1, wherein the antenna port numbers for the demodulation reference signals are associated with numbers of the virtual resources and allocated per user.

6. The base station apparatus according to claim 5, wherein the virtual resources are allocated to the physical resources in a distributed manner in a time direction and the frequency direction.

7. The base station apparatus according to claim 6, wherein transmission diversity is applied.

8. The base station apparatus according to claim 5, wherein transmission diversity is applied.

9. The base station apparatus according to claim 1, wherein the demodulation reference signals are transmitted using two antenna ports per user.

10. The base station apparatus according to claim 9, wherein the virtual resources are allocated to the physical resources in a distributed manner in a time direction and the frequency direction.

11. The base station apparatus according to claim 10, wherein transmission diversity is applied.

12. The base station apparatus according to claim 9, wherein transmission diversity is applied.

13. A mobile terminal apparatus comprising:
a receiver that receives, from a base station apparatus that transmits downlink signals using a resource region for downlink control signals and a resource region for downlink data signals, downlink control signals that are allocated, in a distributed manner, to a plurality of virtual resources that are set in a plurality of physical resources that are arranged in a frequency direction in the resource region for downlink data signals; and
a mobile station baseband signal processor that demodulates the downlink control signals received by the receiver,
wherein demodulation reference signals are used in demodulation of the downlink control signals and when a multiplexing method of the virtual resources is CDM or interleaved FDM/TDM, antenna port numbers associated with numbers of the virtual resources are allocated per user.

14. A communication system, comprising:
a base station apparatus that transmits downlink signals using a resource region for downlink control signals and a resource region for downlink data signals, setting a plurality of virtual resources for downlink control signals in a plurality of physical resources that are arranged in a frequency direction in the resource region for downlink data signals, allocating the downlink control signals, in a distributed manner, to the virtual resources, and transmitting the downlink control signals to a mobile terminal apparatus; and the mobile terminal apparatus demodulating the downlink control signals received from the base station apparatus, wherein demodulation reference signals are used in demodulation of the downlink control signals and when a multiplexing method of the virtual resources is CDM or interleaved FDM/TDM, antenna port numbers associated with numbers of the virtual resources are allocated per user.

15. A communication method comprising the steps of:
in a base station apparatus that transmits downlink signals using a resource region for downlink control signals and a resource region for downlink data signals:
  setting a plurality of virtual resources for downlink control signals in a plurality of physical resources that are arranged in a frequency direction in the resource region for downlink data signals;
  allocating the downlink control signals, in a distributed manner, to the virtual resources; and
  transmitting the downlink control signals to a mobile terminal apparatus; and
in the mobile terminal apparatus:
  receiving the downlink control signals from the base station apparatus; and
  demodulating the received downlink control signals,
wherein demodulation reference signals are used in demodulation of the downlink control signals and when a multiplexing method of the virtual resources is CDM or interleaved FDM/TDM, antenna port numbers associated with numbers of the virtual resources are allocated per user.

* * * * *